US009491131B1

(12) United States Patent
Herrick et al.

(10) Patent No.: US 9,491,131 B1
(45) Date of Patent: Nov. 8, 2016

(54) PUSH COMPOSER

(71) Applicant: Urban Airship, Inc., Portland, OR (US)

(72) Inventors: Michael J. Herrick, Portland, OR (US); Alexander Aaron Mace, Portland, OR (US)

(73) Assignee: Urban Airship, Inc., Portland, OR (US)

( * ) Notice: Subject to any disclaimer, the term of this patent is extended or adjusted under 35 U.S.C. 154(b) by 395 days.

(21) Appl. No.: 13/763,519

(22) Filed: Feb. 8, 2013

Related U.S. Application Data

(60) Provisional application No. 61/598,289, filed on Feb. 13, 2012.

(51) Int. Cl.
*G06F 3/048* (2013.01)
*H04L 12/58* (2006.01)
*G06F 3/0482* (2013.01)

(52) U.S. Cl.
CPC ............. *H04L 51/24* (2013.01); *G06F 3/0482* (2013.01)

(58) Field of Classification Search
CPC ................. G06F 3/017; G06F 3/048–3/04883
See application file for complete search history.

(56) References Cited

U.S. PATENT DOCUMENTS

| | | | |
|---|---|---|---|
| 6,311,180 B1 * | 10/2001 | Fogarty | G06F 17/30905 707/749 |
| 8,761,797 B1 | 6/2014 | Norton | |
| 2002/0156618 A1 * | 10/2002 | Mathur et al. | 704/9 |
| 2003/0148771 A1 | 8/2003 | de Verteuil | |
| 2004/0257259 A1 * | 12/2004 | Jindal | 341/176 |
| 2005/0197121 A1 | 9/2005 | Fujiwara et al. | |
| 2005/0268080 A1 * | 12/2005 | Quang et al. | 713/1 |
| 2006/0025161 A1 | 2/2006 | Funato et al. | |
| 2008/0010262 A1 | 1/2008 | Frank | |
| 2008/0108370 A1 | 5/2008 | Aninye | |
| 2008/0133336 A1 * | 6/2008 | Altman et al. | 705/10 |
| 2008/0174570 A1 * | 7/2008 | Jobs et al. | 345/173 |
| 2008/0208620 A1 | 8/2008 | Karkanias et al. | |
| 2008/0222283 A1 | 9/2008 | Ertugrul et al. | |
| 2009/0265345 A1 | 10/2009 | Carroll | |
| 2010/0325194 A1 | 12/2010 | Williamson et al. | |
| 2011/0154287 A1 * | 6/2011 | Mukkamala et al. | 717/105 |
| 2011/0238608 A1 | 9/2011 | Sathish | |
| 2011/0258049 A1 | 10/2011 | Ramer et al. | |
| 2012/0317205 A1 | 12/2012 | Lahiani et al. | |
| 2013/0054706 A1 | 2/2013 | Graham et al. | |
| 2013/0324098 A1 | 12/2013 | Piemonte et al. | |
| 2014/0297175 A1 | 10/2014 | Zarem et al. | |

* cited by examiner

*Primary Examiner* — Claudia Dragoescu
(74) *Attorney, Agent, or Firm* — Fenwick & West LLP

(57) ABSTRACT

Composing a push notification is disclosed. A first selection comprising at least an operating system of a first device is received. An interface configured to receive, from a user, instructions associated with the push notification is provided. At least a portion of the instructions is used to graphically render to a user how a display interface of the first device would display the push notification, in a first state, if it was received by that instance.

24 Claims, 44 Drawing Sheets

```
01  {
02      "device_token": "0985ae34-439e-4418-b769-0e8a3fe6552b",  ⟵ 502
03      "last_seen": "Fri Jan 04 13:18:45 UTC 2013",  ⟵ 504
04      "latitude": "37.8030328",
05      "longitude": "-122.4349973",  ⟵ 506
06      "session_id": "98908D60-362D-4F78-9906-96E486DD354F",
07      "requested_accuracy": "NONE",
08      "update_type": "CHANGE",
09      "provider": "NETWORK",
10      "update_dist": "NONE",  ⟵ 508
11      "horiz_accuracy": "65",
12      "vert_accuracy": "10",
13      "foreground": false
14  }
```

FIG. 5A

```
01. Look up the boundaries that surround the point (37.7749295,-122.4194155)
02. GET /api/location/37.7749295,-122.4194155
03.
04. {
05.   "features": [
06.     <Census Tract 201>,
07.     <Voting Precinct 06230>,
08.     <Zip Code 94103>,
09.     <California Assembly District 13>,
10.     <California Congressional District 8>,
11.     <San Francisco County>,
12.     <San Francisco City>,
13.     <San Francisco Unified School District>,
14.     <San Francisco Urban Area>,
15.     <California State Senate District 3>,
16.     <California State>,
17.     <America/Los_Angeles Timezone>,
18.     <United States of America Country>
19.   ]
20. }
```

FIG. 5B

Latitude/Longitude: 37.77135° N, 122.3863° W
Observation Timestamp: 2013-11-21, 13:45
Device ID: 78910
APP ID: 6732

Polygons: Candlestick Park, zip code 94124

Time slices: 2013; 2013-11; 2013-11-21; 2013-11-21 1300; 2013-11-21 13:45

App_key: ts_dimension: poly_dimension —— 622

App6732: 2013-11-21 13: Candlestick Park —— 624
App6732: 2013-11: Candlestick Park —— 626

Johnny:
- Day 1: Visits Austin.
- Day 2: Stays in Austin.
- Day 3: Stays in Austin.

Sally:
- Day 1: Visits Austin.
- Day 2: Visits New York City.
- Day 3: Visits Los Angeles.

George:
- Day 1: Visits Los Angeles.
- Day 2: Visits Austin.
- Day 3: Stays in Austin.

FIG. 9A

| Bucket Key | Bucket Contents |
|---|---|
| sampleapp.day1.austin | {johnny, sally} |
| sampleapp.day1.newyorkcity | {} |
| sampleapp.day1.losangeles | {george} |
| sampleapp.day2.austin | {johnny, george} |
| sampleapp.day2.newyorkcity | {sally} |
| sampleapp.day2.losangeles | {} |
| sampleapp.day3.austin | {johnny, george} |
| sampleapp.day3.newyorkcity | {} |
| sampleapp.day3.losangeles | {sally} |

Query: Send content to anybody that was in Austin on Day 1. ⌒ 922
Buckets: sampleapp:day1:austin ⌒ 924
Results: (johnny, sally) ⌒ 926

Query: Send content to anybody that was in Austin on Day 1 and Los Angeles on Day 3.
Buckets: sampleapp:day1:austin AND sampleapp:day3:losangeles
Results: (sally)

Query: Send content to anybody that was in Austin on Day 1 or Austin on Day 2.
Buckets: sampleapp:day1:austin OR sampleapp:day2:austin
Results: (johnny, sally, george)

Query: Send content to anybody that was in Austin on Day 1 and not in Austin on Day 2.
Buckets: sampleapp:day1:austin AND NOT sampleapp:day2:austin
Results: (sally)

FIG. 9C

Start

Comparison 1

Comparison 2

Comparison 3

```
01.  "criteria": {
02.    "and": [
03.      {
04.        "tag": "finance"
05.      },
06.      {
07.        "or": [
08.          {
09.            "location": {
10.              "date": {
11.                "recent": {
12.                  "days": 7
13.                }
14.              },
15.              "id": "Chicago"
16.            }
17.          },
18.          {
19.            "location": {
20.              "date": {
21.                "recent": {
22.                  "days": 7
23.                }
24.              },
25.              "id": "New York City"
26.            }
27.          }
28.        ]
29.      }
30.    ]
31.  }
```

1400 (arrow to code block); 1402 (dashed box around lines 07–27)

FIG. 14

```
01. "criteria":{
02.   "and":[
03.     {
04.       "bot":[
05.         "tag": "San Francisco Bay Area Beyonce Concert Attendee"
06.       ]
07.     },
08.     {
09.       "location":{
10.         "date":{
11.           "recent":{
12.             "days": 2
13.           }
14.         },
15.         "id": "San Francisco Bay Area"
16.       }
17.     }
18.   ]
19. }
```

FIG. 16

PUSH COMPOSER

CROSS REFERENCE TO OTHER APPLICATIONS

This application claims priority to U.S. Provisional Patent Application No. 61/598,289 entitled PUSH COMPOSER filed Feb. 13, 2012 which is incorporated herein by reference for all purposes.

BACKGROUND OF THE INVENTION

As the number of connected mobile devices continues to grow, real-time messaging has become an increasingly popular tool for engaging mobile device users. However, as each mobile platform has its own real-time messaging protocol, and each operating system has a unique presentation flow and user experience, managing message creation on the disparate platforms can be difficult.

BRIEF DESCRIPTION OF THE DRAWINGS

Various embodiments of the invention are disclosed in the following detailed description and the accompanying drawings.

FIG. 5A is a diagram illustrating an embodiment of location event information included in an example device update.

FIG. 5B is a diagram illustrating an embodiment of returned polygon boundary identifiers.

FIG. 6B is a diagram illustrating an embodiment of keys for accessing data structures for buckets.

FIG. 9A is a diagram illustrating an embodiment of example user activity.

FIG. 9B is a diagram illustrating an embodiment of a representation of buckets and corresponding keys for the buckets.

FIG. 9C is a diagram illustrating an embodiment of example queries and corresponding buckets and results.

FIG. 14 is a diagram illustrating an embodiment of a code representation of an audience definition including Boolean logic.

FIG. 16 is a diagram illustrating an embodiment of a code representation of an audience definition including Boolean logic.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
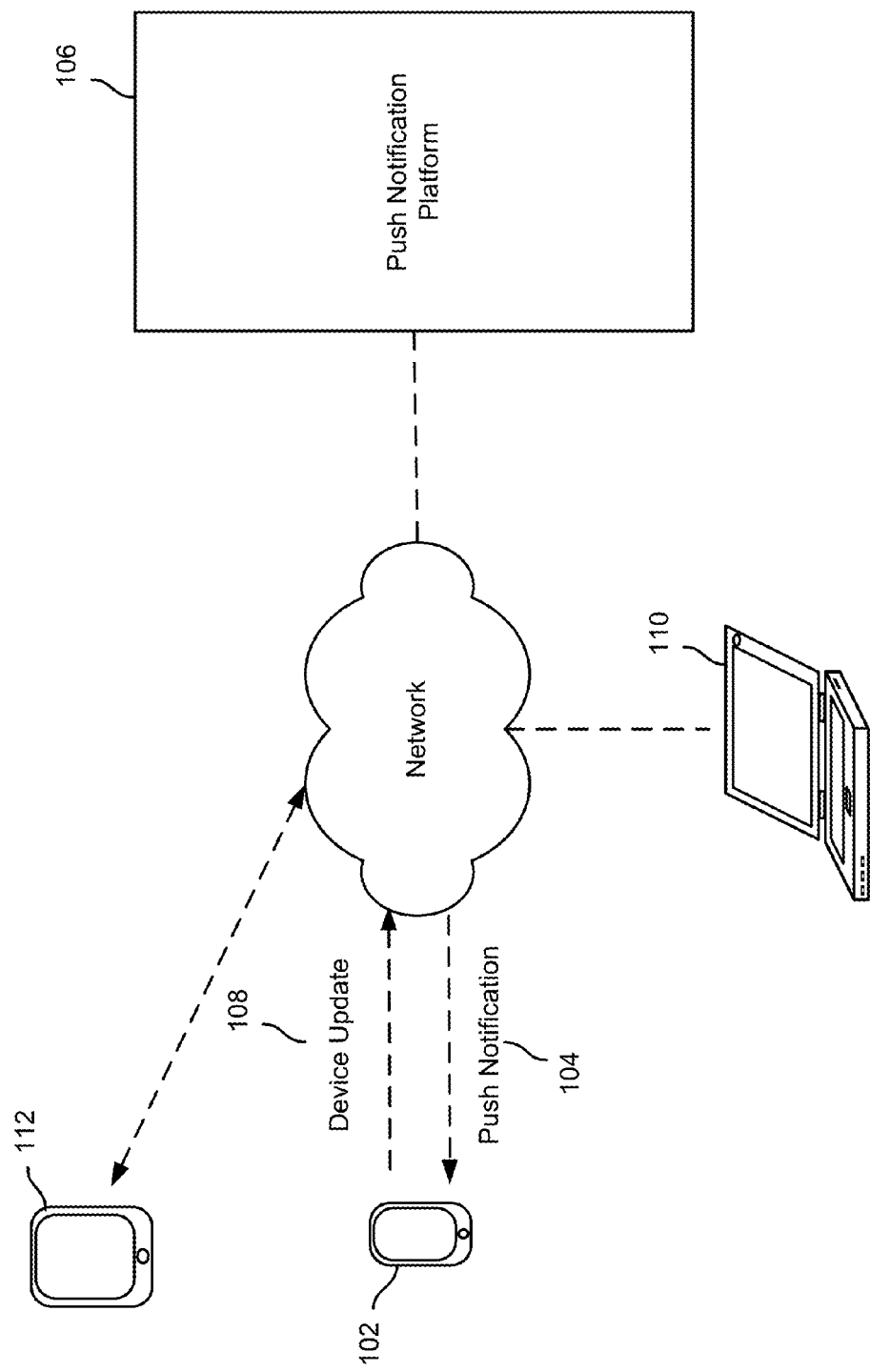
FIG. 1 is a diagram illustrating an embodiment of an environment in which push notifications are managed.

FIG. 1 is a diagram illustrating an embodiment of an environment in which push notifications are managed. In the example shown, mobile device 102 is a smartphone belonging to an individual hereinafter referred to as "Bob." Installed on his smartphone (or tablet, desktop, laptop, or other mobile device) is a popular sports news application for a leading sports network. In the example shown, Bob and other users have given permission for installed applications to receive push notifications (104), for example, from a push notification platform (106). The installed application on Bob's smartphone has included in it a software developer kit (SDK) for handling push notifications. Bob has also allowed the installed application to collect and track information about his behavior, his smartphone, and the application, and to send the information to the push notification platform in the form of a device update (108). The device update can include information such as Bob's preferences (e.g., for a particular sports team), location information about where Bob has been and when, analytics information about how often Bob opens the application and for how long, an identifier for the application (and its version), the version of a push notification library in the application, as well as meta information, such as information about the carrier for the phone, the device's make/model, its operating system, etc. In some embodiments, the collection of location information (e.g., GPS reading) is done at the time that Bob opens up his app (e.g., in the foreground), or can also be done in the background when his position has changed significantly (e.g., via iOS significant change location service). Different operating system platforms (e.g., Android, Blackberry, etc.) can have different standards for location collection. Custom location collection protocols can also be implemented.

In some embodiments, the location, analytics, and meta information is aggregated over time on the phone (e.g., location events, app open/close events, etc. are queued as they occur) and batched together by the application into a device update that is sent to the push notification platform 106 via one or more networks represented in FIG. 1 as network cloud 114. In some embodiments, the device update is sent periodically (e.g., information is batched, and the internal cellular radio of Bob's smartphone is activated every 5 minutes to send device updates).

In the example shown in FIG. 1, device updates are received by push notification platform 104 from multiple devices that can be used by multiple users. As one example, device 112 can belong to another user. Throughout the course of a day, the push notification platform may receive a high volume of device updates as a large number of devices may have the application installed and be configured to send device updates. For example, a single device such as Bob's smartphone may send out multiple device updates a day, and Bob can also have multiple devices in addition to his smartphone, such as a tablet.

In the example shown, the push notification platform processes the location and analytics information included in the device update in order to index a device such as Bob's smartphone. For example, given location information, such as latitude and longitudinal coordinates, Bob's smartphone can be indexed based on where it has been. In addition to location, Bob's smartphone can further be indexed by time, for example, to store a record that Bob's smartphone was in San Francisco at 3:04 pm on Jan. 15, 2013. Bob's smartphone can also be indexed according to tags, such as Bob's preferences for his favorite football teams. Device updates can also be processed to determine a record of how Bob interacts with the application, for example, how quickly Bob opens the sports news application after receiving a push notification, how long he keeps the application open, etc.

By indexing devices based on the device updates received, push notification platform 106 has stored historical information about where Bob has been and when and how he interacts with an application. The historical information can be queried so that an individual, such as a digital marketer/publisher hereinafter referred to as "Alice," who manages push notifications for the sports news application using computer 110, can define an audience to which she would like to send a push notification. For example, using the historical indexed information, Alice can use the push notification platform (e.g., via a web interface) to specify an audience of users who were in the Tribeca neighborhood of New York within the past 3 days and that like the Boston Red Sox (e.g., users matching specified location, time, and tag criteria). Additionally, using the historical information, Alice can further view reports on the effectiveness of push notifications that have been sent. For example, Alice can view how quickly people responded to a push notification by opening their application, as well as their in-application time (e.g., how long they kept the application open). This can be used to inform Alice on how to create more effective push notifications.

In some embodiments, as Alice composes a push notification to be sent to her defined audience (e.g., via a web interface), she is provided with a push notification composer interface that allows her to preview how the push notification she is drafting will appear when received by a device such as Bob's smartphone. Previews for other types of smartphones (e.g., running different operating systems, such as iOS, Android, Blackberry, etc.) can also be generated. Additionally, Alice's push notification, which can include specified text, icons, badges, etc., can be validated to ensure that the push notification that is ultimately sent does not exceed data limits on the size of a push notification or any other limitations, which may face different restrictions based on the operating system.

Figure 2:
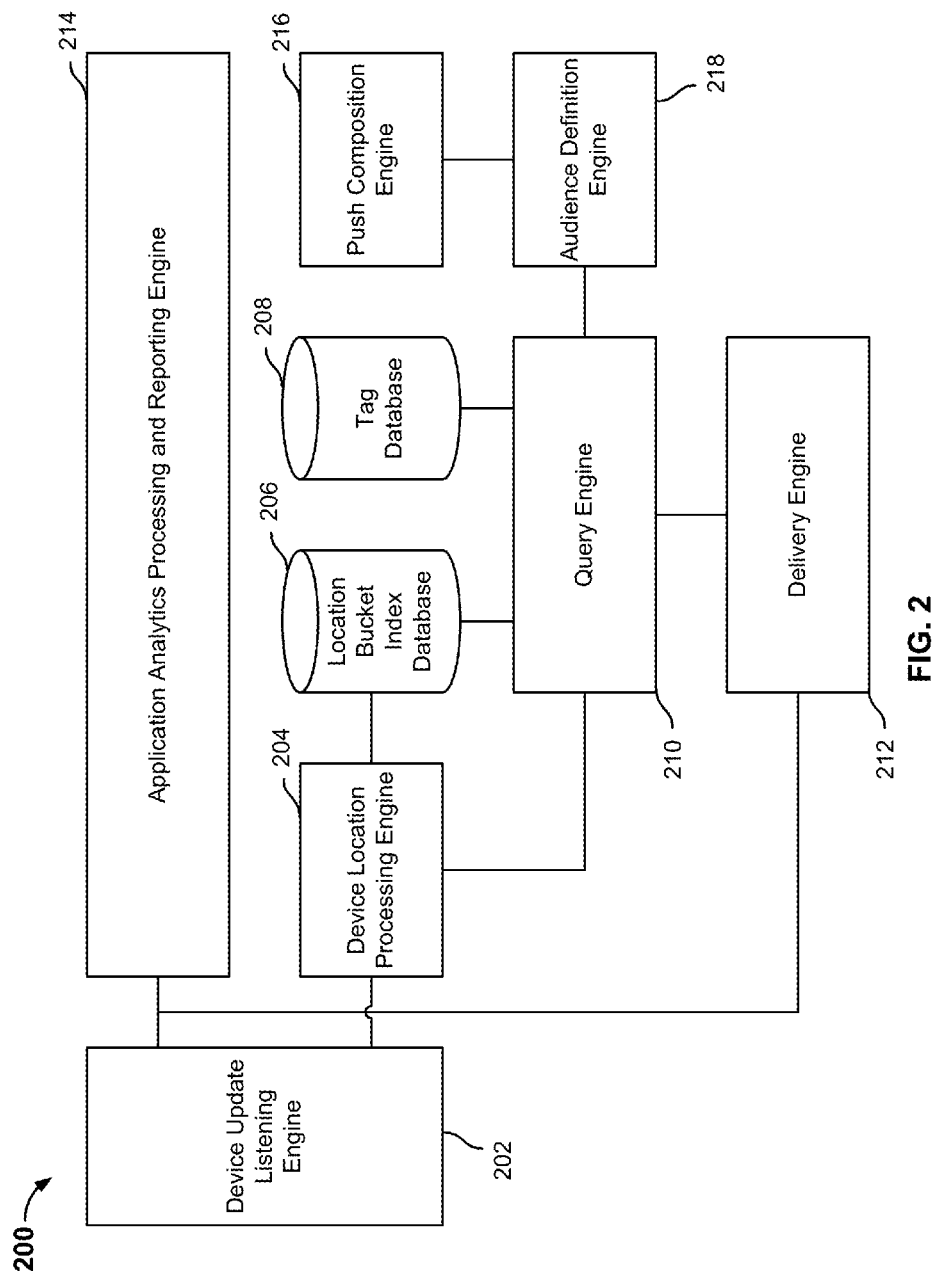
FIG. 2 is a block diagram illustrating an embodiment of a push notification platform.

FIG. 2 is a block diagram illustrating an embodiment of a push notification platform. In some embodiments, the push notification platform of FIG. 2 is an example of push notification platform 106 of FIG. 1. In the example shown, push notification platform 200 includes device update listening engine 202, device location processing engine 204, and location bucket index database 206. Push notification platform 200 further includes tag database 208, query engine 210, and delivery engine 212. Push notification platform 200 further includes application analytics processing and reporting engine 214. Push notification platform 200 further includes push composition engine 216 and audience definition engine 218.

In some embodiments, device update listening engine 202 is configured to listen for and receive a stream of device update objects from devices such as Bob's smartphone 102. In some embodiments, device update listening engine 202 is implemented using a Kafka queuing system (a distributed queuing system), running on a cluster of commodity server hardware, such as Linux servers. In some embodiments, the device update includes location event information such as GPS coordinates (e.g., latitude and longitude), a precision score for how precise the coordinates are, a source of the coordinates (e.g., GPS, cell tower, WiFi, etc.), as well as a timestamp indicating the time of observation of the location event information. In some embodiments, the timestamp is generated at the device. In some embodiments, the device update includes information about user behavior and how an application on the device has been interacted with, such as timestamps of when the application was open and closed. In some embodiments, the duration for which the application is open or time in the application can also be included. In some embodiments, as application events (e.g., application opens and closes) and location events (e.g., significant changes in location) occur, they are queued on the phone and then batched together (along with meta information) to be included in a device update. In some embodiments, the device update is sent from the phone periodically (e.g., every 5 minutes). Sending of a device update can also occur asynchronously, for example, whenever a user opens the application or when their location has changed significantly. Additionally, the device update can include a device identifier of the device from which the device update was received, an identifier of the application installed on the device that collected the information, as well as meta information about the device (e.g., operating system, carrier, etc.) as described above.

In some embodiments, device location processing engine 204 is configured to receive location event information (e.g., from device updates received by device update listening engine 202), such as the GPS coordinates and observation timestamps described above. In some embodiments, the location processing engine uses the location information to index the device by time and place. As will be described in more detail below, in some embodiments, device location processing engine 204 is configured to convert a latitude/longitude into a set of polygons which encompass the latitude/longitude. In some embodiments, polygons represent descriptive boundaries of locations. The descriptions can be of geographical locations of varying granularities/precisions, such as neighborhoods, ZIP codes, counties, cities, states, countries, continents, hemispheres, etc. In some embodiments, custom polygons can also be designed or used to define a region of interest, such as a company's sales regions, buildings, landmarks, congressional districts, etc. In some embodiments, the boundaries of locations can be described using multi-polygons. For example, the state of Hawaii can be described in a multi-polygon as it is composed of multiple islands. Another example of a geographical region defined using a multi-polygon is the United States (e.g., Alaska, territories, etc.). Multi-polygons can also result due to gerrymandering or because of physical bodies (e.g., lakes, mountains, etc.).

In some embodiments, a record/representation for the device (e.g., a device identifier) is stored in location bucket index database 206. In some embodiments, the location bucket index database is implemented on a single server or a cluster of servers using a column-based database such as Cassandra. In some embodiments, the device (represented by its device identifier, which can be included in the device update) is stored in buckets, and is indexed by the polygons that it has been in and the time that it was in the locations/regions defined by the polygons, as will be described in more detail below.

Additionally, as will also be described in more detail below, the historical information that is stored can be queried when an audience for a push notification is defined in order to find users who were in a particular location at a particular time (e.g., to find users who were in the SoMa neighborhood polygon of San Francisco two days ago).

Tag database 208 is configured to store tag information. In some embodiments, the tag database is implemented on a single server or a cluster of servers (e.g., Linux servers). In some embodiments, tag database 208 is implemented using Cassandra. In some embodiments, tags are information (e.g., metadata information) used to indicate characteristics, preferences, and/or behaviors of a user and/or their device. For example, Bob (represented using the device identifier of his smartphone) may also have a music app and be tagged as a fan of a particular music group, hereinafter called "TheRockBand," etc. In some embodiments, Bob is tagged as a fan based on an explicit indication of a preference for TheRockBand. Alice, the digital marketer can send push notifications based on the tags (e.g., send a push notification for a free TheRockBand song to all users, or devices associated with users, that are tagged as TheRockBand fans).

In some embodiments, query engine 210 is configured to perform search queries to find users (represented by device identifiers of their devices) matching a search request. For example, suppose digital marketer Alice defines as an audience fans of the football team, the "Corvids," who were in Atlanta within the past three days. The query engine can search through databases such as location bucket index database 206 and tag database 208 to find device identifiers matching the search criteria. As will be described in more detail below, in some embodiments, the various databases queried by the query engine are disparate, independent backends existing on heterogeneous clusters returning their own separate streams of device identifiers. In some embodiments, the separate results streams are then merge joined by the query engine to generate a final set of results. For example, the query engine can query the tag database (208) to determine device identifiers that are tagged as Corvids fans, while the query engine can separately query the location bucket index database 206 to determine device identifiers that have been in Atlanta within the past three days. Each database will produce a corresponding stream of results (e.g., list of device identifiers), which are then further processed and merged-joined by the query engine to generate a refined list of device identifiers that match both the location and tag criteria. Also as will be described in more detail below, in some embodiments, the query engine is configured to determine queries for requests that include Boolean logic operators (e.g., conjunction/AND, disjunction/OR, negation/complement/exclusion/NOT, XOR, etc.). Using the Boolean logic operators, Alice can more precisely define her audience, such as users who have been in New York OR San Francisco in the past 3 days AND are fans of the Corvids but are NOT fans of another team, the "Equines."

In some embodiments, delivery engine 212 is configured to deliver push notifications. For example, after devices matching a query defining an audience are found, push notifications are sent to the devices. For example, digital marketer Alice can send a message saying, "Go Corvids!" to users who are Corvids fans who were at the Corvids' stadium for the game two days ago. Device identifiers returned from the query engine can be used by delivery engine 212 to identify corresponding devices that are to be destinations of a push notification including the message.

In some embodiments, application analytics processing and reporting engine 214 is configured to process analytics information in order to determine quantitative data on user behavior with mobile applications and generate reports including the quantitative data. As will be described in more detail below, analytics information can be processed to determine how many users opened the mobile application in response to receiving a push notification, the influence that the push notification had in user engagement with the mobile application, how long the users were in the application, what days and times received the largest response to a push notification, etc. A digital marketer such as Alice can then view reports generated by the engine to view the quantitative data in order to better understand the relationship between push notifications and user engagement.

In some embodiments, push composition engine 216 is configured to allow a user to compose and configure push notifications. In some embodiments, the push composition engine is further configured to generate a preview of the push notification as it would appear on a target device. This allows a digital marketer to preview, prior to sending out the push notification, how elements of the push notification, such as text, badges, sound, etc. will appear on target devices that can differ based on operating system (e.g., iOS vs. Android), device size (e.g., smartphone vs. tablet), different landing pages (e.g., lock screen vs. home screen vs. notification center screen), etc. In some embodiments, the push composition engine is also configured to validate a composed push notification. For example, the push notification can be validated to determine whether the total data size of the push notification exceeds a maximum limit (and provide an error message), display an indication of how many characters remain for the message before the data limit is exceeded, etc.

In some embodiments, audience definition engine 218 is configured to allow a user to define an audience for content such as push notifications. In some embodiments, the audience is defined by specifying audience segment criteria, such as location, time, tags, etc. In some embodiments, the audience definition engine is configured to provide a user, such as the digital marketer, Alice, with polygons which she can select from, as part of defining an audience for her push notification.

Processing Location Device Updates

Figure 3:
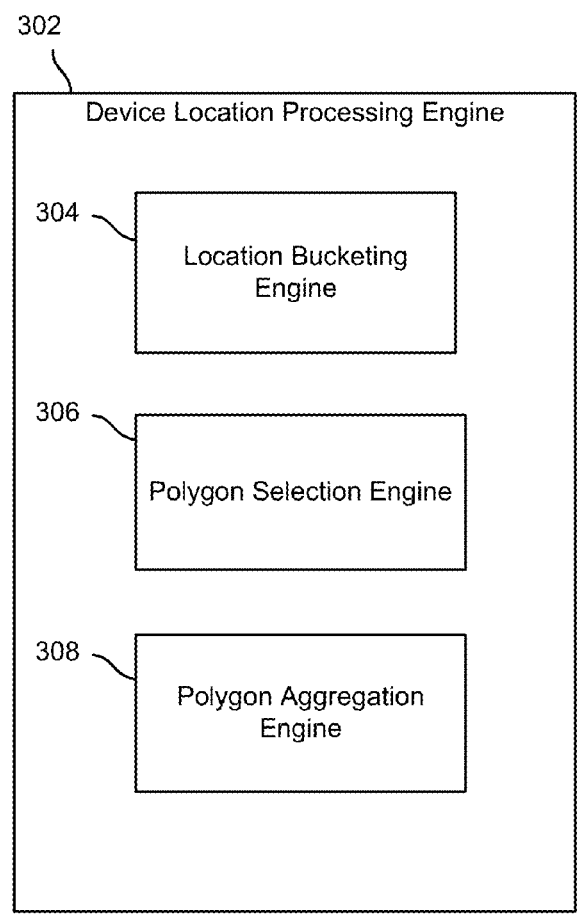
FIG. 3 is a block diagram illustrating an embodiment of a device location processing engine.

FIG. 3 is a block diagram illustrating an embodiment of a device location processing engine. In some embodiments, device location processing engine 302 of FIG. 3 is device location processing engine 204 of FIG. 2. In the example shown, device location processing engine 302 includes location bucketing engine 304, polygon selection engine 306, and polygon aggregation engine 308.

In some embodiments, location bucketing engine 304 is configured to index a device by the polygon boundaries it was in and the time that it was within the polygon boundaries. In some embodiments, indexing includes determining the appropriate polygon-time bucket indexes in which to include/insert/store the mobile device. In some embodiments, the location bucketing engine is implemented using a Java program running on a Linux server.

In some embodiments, polygon-time buckets are data structure entities, with a given bucket representing a particular combination/pairing of polygon boundaries and time slices. In some embodiments, determining the polygon-time buckets that a device should be inserted into includes determining the polygon boundaries that a device was in and the time slices for which the device was in the polygon boundaries.

In some embodiments, the polygon boundaries are determined by converting a latitude/longitude (that can be extracted from location event information) into the polygon boundaries that are found to surround the latitude/longitude.

In some embodiments, time slices represent various granularities, precisions, and/or dimensions of time during which the mobile device was in a location. Examples of time slices are described below. One way that time slices can be determined is by expanding an observation timestamp into different levels of granularity/precision. For example, if a timestamp includes the month, day, and year of the observation, there are three levels of time slices/precisions.

In the event that the mobile device is determined to be in a particular polygon boundary at a certain time slice, the device identifier for the mobile device then can be inserted into the appropriate polygon-time bucket representing the polygon and time slice. For example, based on the latitude/longitude and observation timestamp, it can be determined that Bob's smartphone was in the polygon boundaries defining the SoMa neighborhood as well as the city of San Francisco on an observed date of Mar. 23, 2013. Thus, Bob's smartphone was in two polygons (SoMa neighborhood and San Francisco), and for each of those polygons, he was observed to be in the polygon at three different time precisions (the year 2013, the month of March, 2013, and the day of Mar. 23, 2013). This would result in Bob's mobile device being inserted into six different polygon-time buckets: (Polygon: SoMa, Time: 2013); (Polygon: SoMa, Time: March, 2013); (Polygon: SoMa, Time: Mar. 23, 2013); (Polygon: San Francisco, Time: 2013); (Polygon: San Francisco, Time: March, 2013); (Polygon: San Francisco, Time: Mar. 23, 2013).

Although in the above example, based on Bob's latitude/longitude, he was found to be in two polygons, any number of polygons can be found that encompass a latitude/longitude. For example, Bob could further be included in a Northern California polygon, a California polygon, a United States polygon, and/or a North America polygon. Additionally, although in the above example, the timestamp observation included month, day, and year, other granularities/precisions/slices derived from the timestamp, such as hour, minute, second, day of the week, week of the year, etc. Given N polygon dimensions and M timestamp dimensions, Bob's mobile device identifier will be inserted into N×M polygon-time bucket indexes. In some embodiments, instead of being indexed by both location and time, the mobile device is indexed based only on location. In some embodiments, the buckets are stored in a k-d tree data structure, which allows for a high volume of buckets to be stored. The buckets can be stored for example, in location bucket index database 206 of FIG. 2.

In some embodiments, the location processing engine identifies/determines appropriate polygon-time bucket indexes for a mobile device in part by using polygon identifiers received from polygon selection engine 306, which will be described in more detail below. In some embodiments, the location bucketing engine sends a latitude/longitude to the polygon selection engine and receives from the polygon selection engine polygon identifiers corresponding to polygon boundaries that match and encompass the latitude/longitude. Other types of coordinate systems and location information can also be used to determine matching polygons. In some embodiments, the received polygon identifiers and the exploded/expanded time slices are used to identify the appropriate polygon-time buckets in which to store the mobile device. In some embodiments, in the event that a bucket corresponding to a particular combination of polygon boundaries and time slices does not exist, the bucket is created on-demand and the mobile device identifier is then inserted into the newly created bucket.

As will be described in more detail below, pre-indexing mobile devices by location and time allows for efficient querying when searching for devices that match specified location/time criteria. For example, when the digital marketer Alice wants to send a push notification to people who were in a certain area within the previous two hours, such as the Olympic fencing arena location two hours ago, the buckets corresponding to the location and hour time slices can be directly queried.

Polygon selection engine 306 is configured to convert a latitude/longitude (e.g., received from location bucketing engine 304) into a set of polygon boundaries that encompass the latitude/longitude. In some embodiments, the polygon selection engine is implemented using a spatially aware r-tree as well as software such as a Java Topology Suite (JTS). In some embodiments, the set of polygons is selected from a database of polygons. In some embodiments, the database of polygons is aggregated by polygon aggregation engine 310, as will be described in more detail below.

In some embodiments, the collection of polygons is indexed using the spatially-aware r-tree. The r-tree, which is a spatial data structure that can be used to efficiently determine, given a latitude/longitude, the polygons that surround the latitude/longitude. For example, given the latitude/longitude 37.7135° N, 122.3863° W, the r-tree can determine several polygons in its indexed set that surround the latitude/longitude, such as a polygon describing Candlestick park, a polygon for the ZIP code 94124, a polygon for San Francisco, a polygon for California, a polygon for the United States, etc.

In some embodiments, after determining the polygons surrounding the latitude/longitude, a list of polygon identifiers (e.g., names, numeric identifiers, keys, etc. of polygon boundaries) corresponding to the determined polygons are returned, for example, to location bucketing engine 304, which can in turn be used to determine appropriate buckets in which to include a mobile device.

Polygon aggregation engine 308 is configured to aggregate polygons collected from various data sources. Examples of sources of information defining boundaries of geolocations include TIGER/Line (for U.S. government data), Maponics (for neighborhood polygons), Natural Earth (for country and province polygons), Open-Street Map, etc. Custom polygons can also be collected. For example, an entity such as the International Olympic Committee can create polygons for different Olympic venues, such as a fencing arena, track and field stadium, bobsled course, etc.

In some embodiments, the aggregated polygons received from the disparate sources are formatted differently (e.g., in different formats such as Shapefile, KML, GEOJSON), and the polygon aggregation engine is also configured to reformat and/or homogenize the collected polygons. For example, in some embodiments, the aggregated polygons are converted to a common standardized format, such as GeoJSON using a program such as OGR. Additionally, in some embodiments, further processing is performed, such as realignment of polygons, renaming of polygons, reformatting of original polygon metadata, generating corresponding polygon identifiers, removing duplicate polygons, etc. In some embodiments, the polygons are received with an original identifier associated with their original source. In some embodiments, the original identifier is maintained. For example, data from Natural Earth may have its own identification system. The original identifiers can be maintained so that a customer of a push notification platform can search for devices by explicitly using identifiers from Natural Earth data (e.g., supplying the identifier of Natural Earth data they are interested in). Thus, the data received from the disparate sources can be standardized and prepared so that various upstream polygon data sources can be used by polygon selection engine 306.

Figure 4:
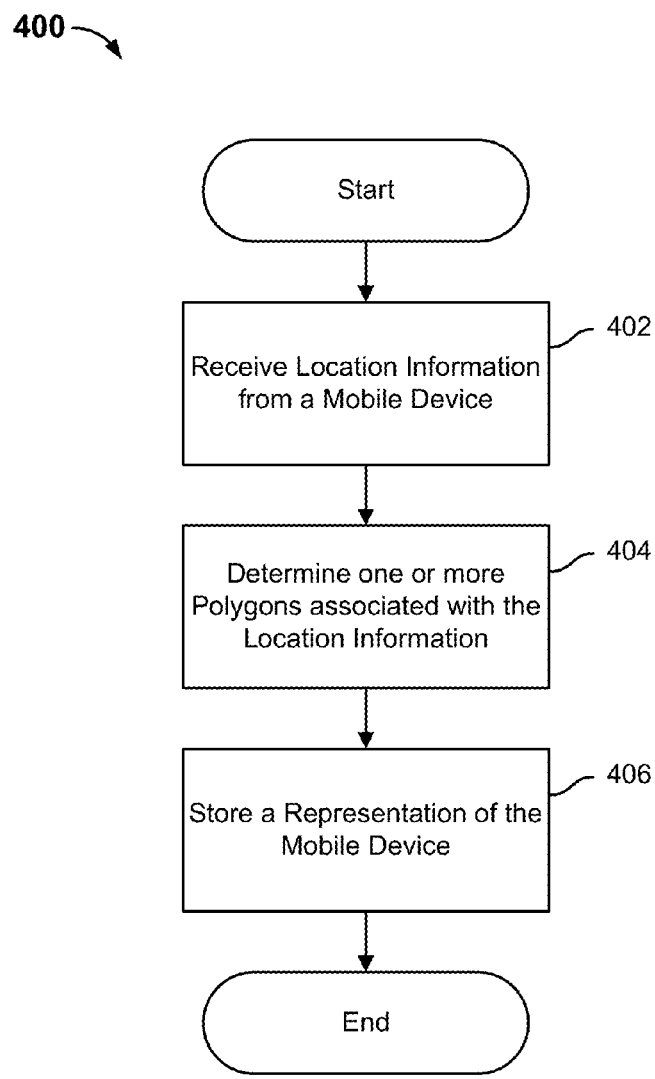
FIG. 4 is a flow diagram illustrating an embodiment of a process for processing location information included in a device update.

FIG. 4 is a flow diagram illustrating an embodiment of a process for processing location information included in a device update. In some embodiments, process 400 is executed by device location processing engine 302 of FIG. 3. The process begins at 402 when location information from a mobile device is received. As described above, in some embodiments, the location information is received from a stream of device updates received from various mobile devices. In various embodiments, location information includes geographical location information (e.g., latitude/longitude coordinates), a timestamp of when the location information was observed, etc.

At 404, one or more polygons associated with the location information are determined. In some embodiments, the location (e.g., latitude/longitude) of a mobile device can be mapped into a set of polygons that surround the location. As described above, the set of matching polygons can be selected from a set of candidate polygons that are aggregated from various data sources. In some embodiments, a list of polygon identifiers corresponding to the matched polygons is returned in response to the conversion/determination of matching polygon boundaries.

At 406, a representation of the mobile device is stored. In some embodiments, storing the mobile device includes inserting a representation of the mobile device (e.g., corresponding device identifier of the mobile device) into appropriate matching polygon-time bucket indexes As described above, in some embodiments, appropriate polygon-time buckets are determined using the one or more matched polygons as well as an expansion of the observation timestamp into a set of time slices. In some embodiments, the matched polygons and expanded time slices comprise polygon and time dimensions that define the appropriate buckets in which to include the mobile device. In some embodiments, as will be shown in an example below, keys to the data structure buckets are formed using the various combinations of polygon and time slice dimensions in order to identify the appropriate polygon-time bucket in which to store the mobile device identifier. In some embodiments, in the event that an appropriate polygon-time bucket does not exist, it is created on-demand (e.g., buckets are not created until required). For example, if no mobile devices were in Antarctica during the month of March, then no bucket corresponding to Antarctica and March would be created. However, if a mobile device was in Antarctica in December, a bucket would be created for the mobile device to be inserted into.

FIG. 5A is a diagram illustrating an embodiment of location event information included in an example device update. In this example, a device token (e.g., device identifier) is shown at 502. At 504, a timestamp of the observation of the location event information is shown. At 506, location information, including latitude and longitude, is shown. At 508, the horizontal and vertical accuracy of the coordinates is shown. Other information, such as the network provider associated with the mobile device is shown as well.

FIG. 5B is a diagram illustrating an embodiment of returned polygon boundary identifiers. As described above, polygon boundaries surrounding a latitude/longitude (e.g., received from a location event) can be determined (e.g., using polygon selection engine 306). In the example shown, polygon boundaries surrounding the latitude/longitude point (37.7749295, −122.4194155) are looked up and returned. For example, given a particular latitude/longitude, thirteen polygon boundaries have been returned, including: Census Tract 201, Voting Precinct 06230, ZIP code 94103, California Assembly District 13, California Congressional District 8, San Francisco County, San Francisco City, San Francisco Unified School District, San Francisco Urban Area, California State Senate District 3, California State, America/Los Angeles time zone, and USA country.

Figure 6A:
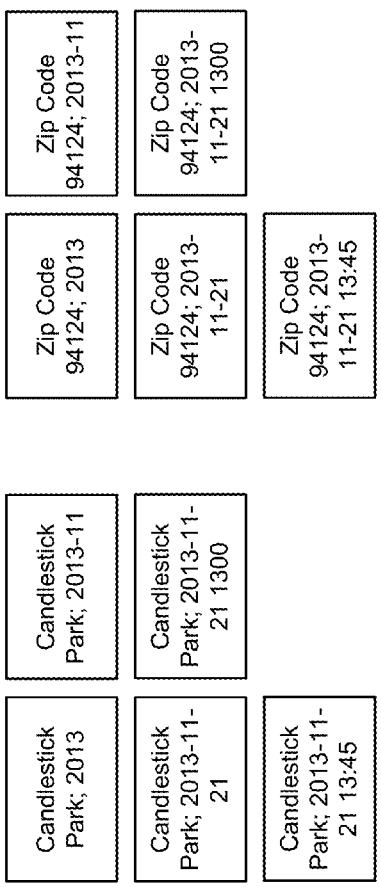
FIG. 6A is a diagram illustrating an embodiment of bucket indexing on a mobile device.

FIG. 6A is a diagram illustrating an embodiment of bucket indexing on a mobile device. In this example, location information including latitude/longitude (37.7135° N, 122.3863° W), a timestamp of the observation (Nov. 21, 2013 13:45), as well as a device identifier (device ID: 78910) are shown at 602. At 604, an example of two polygons surrounding the latitude/longitude is shown. In this example, given the latitude/longitude, polygons for Candlestick Park and the ZIP code 94124 were found to match and surround the latitude/longitude. At 606, an example expansion of the timestamp is shown. In the example shown, there are in total two polygon dimensions (Candlestick Park and ZIP code 94124) and five time dimensions (2013; 2013-11; 2013 Nov. 21; 2013 Nov. 21 1300; 2013 Nov. 21 13:45). Given the dimensions, mobile device ID 78910 will be stored in ten (2 polygon dimensions×5 time dimensions) buckets, representations of which are shown at 608.

FIG. 6B is a diagram illustrating an embodiment of keys for accessing data structures for buckets. In some embodiments, a polygon-time bucket is implemented as a row in a column-based database such as a Cassandra database. In some embodiments, the keys used to access (e.g., write or read device ids) the buckets are generated based on polygon and time slice dimensions. An example of a key and its constituent parts is shown at 622. In the example shown, the key is made up of an app_key (application identifier if there are multiple applications under consideration), the timestamp dimension (e.g., hours, minutes, days, years, etc.), and the polygon dimension (e.g., Candlestick Park, ZIP code 94124, San Francisco, etc.). As another example, using the location information of FIG. 6A (which now also shows an application identifier 6732), a set of polygon-time bucket keys (e.g., used to access the buckets shown at 608 of FIG. 6A) is shown. At 624, a key for the hour bucket for Candlestick Park is shown. At 626, a key for the month bucket for Candlestick Park is shown. Other keys will also be generated based on the app_key for the application and the determined timestamp slice and polygon dimensions. In this example, given K apps, N, timestamp slices, and M polygon dimensions, K×N×M buckets can be created, with K×N×M keys generated to access the buckets.

Querying

Figure 7:
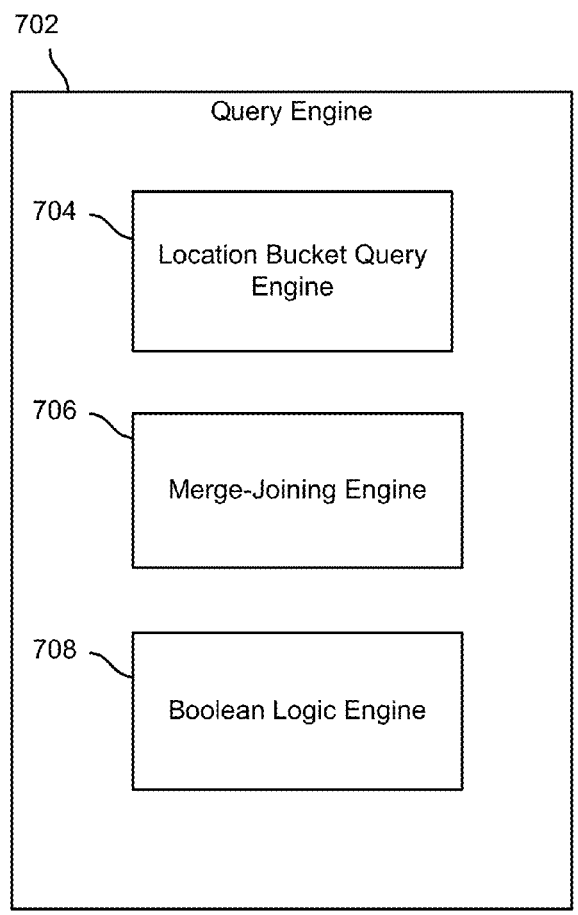
FIG. 7 is a block diagram illustrating an embodiment of a query engine.

FIG. 7 is a block diagram illustrating an embodiment of a query engine. In some embodiments, query engine 702 of FIG. 7 is query engine 210 of FIG. 2. In the example shown, query engine 702 includes location bucket query engine 704, merge joining engine 706, and Boolean logic engine 708. In some embodiments, location bucket query engine 704 is configured to query location polygon-time buckets such as those described above. Merge joining engine 706, as will be described in more detail below, is configured to merge results from disparate backends into a unified set of results. Boolean logic engine 708, as will be described in more detail below, is configured to process queries involving Boolean logic operations. In some embodiments, the query engine is configured to communicate with and query multiple backend databases of various types, such as location backends (e.g., location bucket index database 206 of FIG. 2), tag backends (e.g., tag database 208 of FIG. 2), etc.

Querying Buckets Based on Location and Time

As described above, mobile devices can be indexed into polygon-time buckets based on their location and the time of the observation of the location. As the mobile devices have been pre-indexed into buckets, searching for mobile devices based on geolocation (as specified in a polygon) and time period can be performed efficiently. For example, as will be described in more detail below, if a digital marketer such as Alice requests to send a push notification to people who were at the Olympic fencing arena within the last 30 minutes, only 30 polygon-time buckets (one for each minute) would need to be queried to determine all of the relevant devices that satisfy Alice's request. Additionally, the keys to access the buckets can be generated from the criteria (e.g., application, location, and time period) specified in the request.

Figure 8:
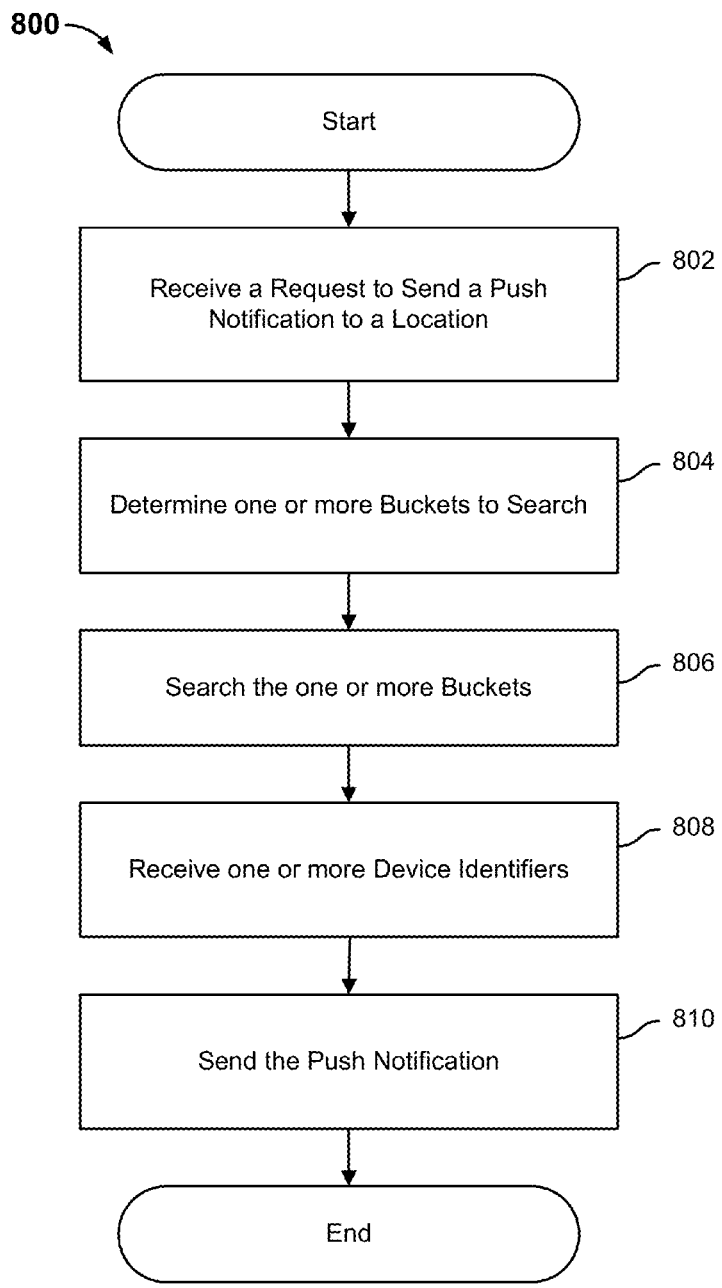
FIG. 8 is a flow diagram illustrating an embodiment of a process for querying location buckets.

FIG. 8 is a flow diagram illustrating an embodiment of a process for querying location buckets. In some embodiments, process 800 is executed by location bucket query engine 704 of FIG. 7. The process begins at 802 when a request to send a push notification to a location is received. For example, the digital marketer Alice, working on the Olympic Games, can request to send a push notification to people who have been in the Olympic fencing arena. In various embodiments, the location criteria can be received in the form of polygon identifiers (e.g., names of polygon boundaries, latitude/longitude coordinates, etc.). In some embodiments, a time period for the request is also received. For example, Alice can further refine the request by defining/specifying an audience for the push notification that has been in the Olympic fencing arena within the last fourteen hours.

At 804, buckets (e.g., polygon-time buckets) to be searched are determined. In some embodiments, determining the buckets to be searched includes generating keys using the specified location and time criteria.

In some embodiments, the specified location criteria information is used to determine the location dimensions (e.g., polygons) for the bucket search. In some embodiments, in the event that the location criteria information is received in the form of a latitude/longitude, the coordinates can be converted to determine polygons encompassing the latitude/longitude, for example by using polygon selection engine 306 of FIG. 3. In some embodiments, a set of coordinates implicating a bounding box for a geographical region can be received in a request, and polygons found to be intersected by the region defined by the bounding box coordinates can be determined. In some embodiments, the received request implicates a polygon boundary (e.g., request specifies a polygon by its identifier). The identified polygon boundaries can be used in generating polygon-time bucket keys.

In some embodiments, in the event that only a location is specified, all buckets associated with the location, irrespective of time, can be determined as appropriate buckets to be searched.

In some embodiments, if a time period is specified in the request, the determination of the buckets to be searched is based on the specification of the time period. In some embodiments, the time period is specified relative to the time of the request. For example, Alice can specify a time period of "within the last 14 hours." In some embodiments, explicit hard start and stop times can be specified. For example, Alice can specify the time period starting from 17:41 to 17:57.

Given the time period and the granularity/precision implicated by the specified time period (e.g., if the request specifies the last 5 minutes, then the granularity/precision implicated is "minutes," versus if the request specified the last 5 hours, then the implicated granularity/precision would be "hours"), the appropriate number of time dimensions/slices can be automatically/dynamically determined to determine the appropriate buckets to be searched. For example, suppose that Alice, at 19:00, specifies that she would like to send a push notification to people who were at the Olympic fencing arena within the past 14 hours (relative time period). In this example, the granularity/precision implicated in the request is in hours, and given that the request was made at 19:00, it can be determined that the 15 polygon-time buckets associated with the Olympic arena (location) from 5:00, 6:00, . . . , 19:00 are the appropriate buckets to be searched. In some embodiments, keys to the buckets are generated using the location (Olympic arena) and determined time slices (hour granularity time slices for 5:00, 6:00, . . . , 19:00). In the event that a hard start and stop time are specified, the buckets between the start time and the stop time (as specified by the granularity/precision of the request) can be determined as appropriate buckets to be searched. For example, if Alice specifies between 17:47 to 17:51, then the 17:47, 17:48, 17:49, 17:50, and 17:51 (if inclusive) buckets for the Olympic fencing arena would be determined as appropriate to be searched. Although Alice has specified a time period, each of the intervening units of time (at the implicated granularity/precision) between the endpoints of the specified time period are expanded out and enumerated in order to determine the number of timestamp dimensions of interest.

Given polygons determined from location criteria and time slices implicated by time period criteria, appropriate bucket keys (such as those described in FIG. 6B) can be generated.

At 806, the determined buckets are searched to retrieve device identifiers. In some embodiments, the keys generated above can be used to access the buckets corresponding to the keys.

At 808, device identifiers are received. In some embodiments, the keys generated based on the location and time period specified in a request to send a push notification are used to access buckets determined to be appropriate to the request. Device identifiers stored in the buckets are retrieved, and at 810, push notifications are sent to the devices represented by and corresponding to the found device identifiers.

As devices are pre-indexed into buckets, relevant devices matching a request (that specifies location and time period) can be efficiently found by converting the specified locations and time periods of the request into keys that can be used to directly access/query the appropriate buckets storing relevant devices matching the request.

An example scenario in which location-time information is received, stored in location buckets, and queried is provided below.

FIG. 9A is a diagram illustrating an embodiment of example user activity. In some embodiments, the user activity information is received via device updates. In the example shown, the location activity of three users (Johnny, Sally, and George) is shown across three days (Day 1, Day 2, and Day 3). In this example, on Day 1, Johnny visited Austin, Sally also visited Austin, and George visited Los Angeles. On Day 2, Johnny stayed in Austin, Sally visited New York City, and George visited Austin. On Day 3, Johnny stayed in Austin, Sally visited Los Angeles, and George stayed in Austin. The location activity information can be stored in location bucket indexes as described above.

FIG. 9B is a diagram illustrating an embodiment of a representation of buckets and corresponding keys for the buckets. In this example, buckets storing the location activity information described in FIG. 9A and their associated keys are shown. Johnny and Sally have been inserted in the first bucket (902), which corresponds to the time period Day 1 and location Austin. As described above, the corresponding key is composed of three parts: <sampleapp:day1: Austin>, corresponding to a name of the application that collected the information ("sampleapp"), a time precision slice ("day1"), and a location ("austin"). In this example, 9 total buckets, corresponding to the specified three days and three locations, are shown, including empty buckets. However, as described above, in some embodiments, buckets are not created until needed (e.g., there is a device that needs to be inserted into a bucket that does not yet exist).

FIG. 9C is a diagram illustrating an embodiment of example queries and corresponding buckets and results. In some embodiments, a bucket query engine such as location bucket query engine 704 of FIG. 7 is used to query appropriate buckets and return results based on criteria specified in a request. At 922, a query corresponding to a request to send content (e.g., push notification) to anybody that was in Austin (location) on Day 1 (time period) is shown. Based on the criteria of the request, an appropriate bucket and key can be determined. At 924, based on the request, a bucket key used to query the bucket corresponding to sampleapp:day1: Austin is generated. At 926, results of the query (Johnny, Sally) are shown.

Merge-Joining Results

In some scenarios, in order to satisfy a request for devices matching specified criteria, disparate backends that are not collocated may need to be queried. As each backend will return its own set of results independent of the results of the other backends, in some embodiments, merging-joining of the different sets of results is required to determine the final set of devices relevant to the request.

For example, suppose Alice wishes to send a push notification to people who were in the Olympic fencing arena within the past two days and who are also tagged as fans of TheRockBand. In Alice's request, both a location and a tag have been specified. In some embodiments, a location backend database, (e.g., location bucket index database 206 of FIG. 2), and a tag database (e.g., tag database 208 of FIG. 2) are separate backends that are not collocated. Thus, in order to fulfill Alice's request, two separate sub-queries are generated, the first querying the location backend for people who were in the Olympic fencing arena within the past two days, and the second querying the tag database for people tagged as fans of TheRockBand.

As the two disparate backends are queried separately, each backend returns its own respective set of results. In some embodiments, the two disparate backends are configured to return a list of device identifiers matching their respective queries. As the request has specified users who satisfy both the specified location and tag requested, the disparate results sets are merge joined by determining the intersection of the sets to calculate the final set of device identifiers to which the push notification should be sent. Other rules/logic can be applied to merge join the sets of results. For example, the sets of results can be merge-joined according to Boolean logic specified in the request, as will be described in more detail below.

Figure 10:
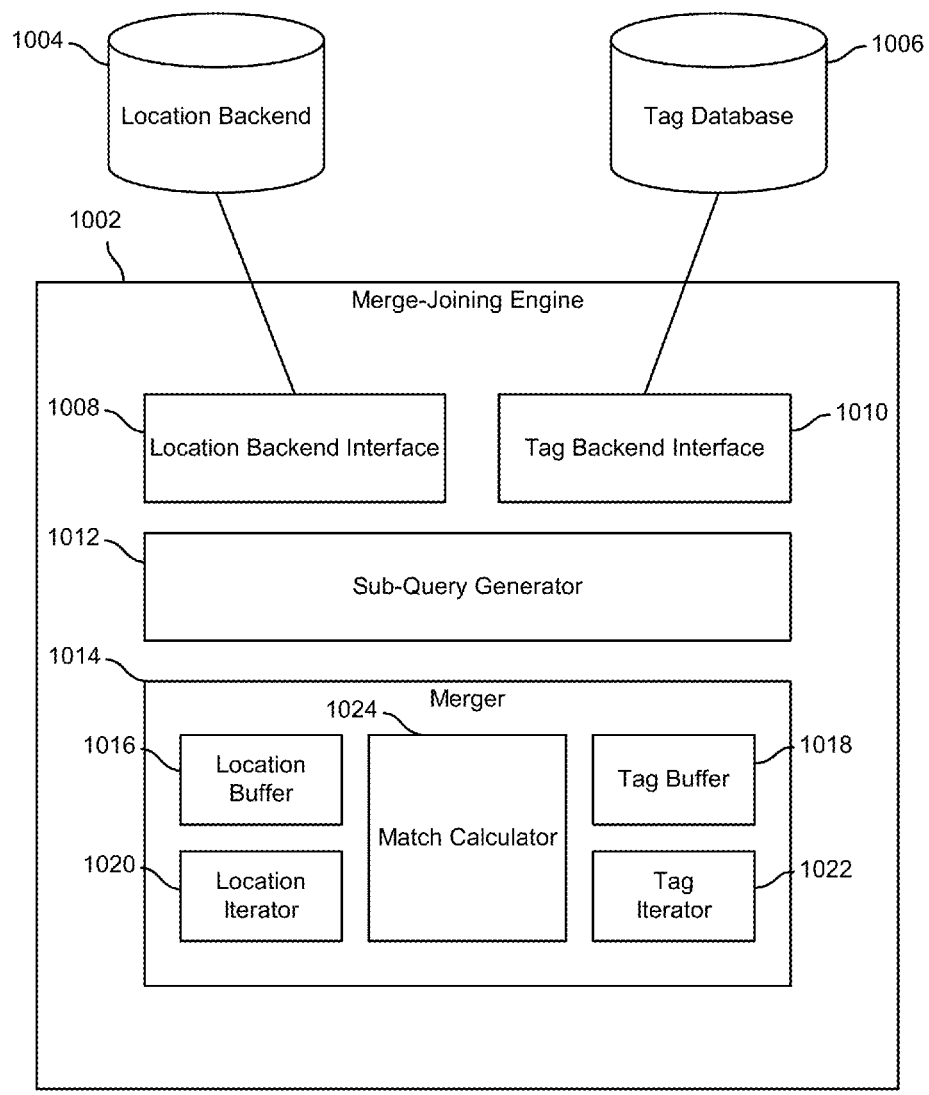
FIG. 10 is a block diagram illustrating an embodiment of a merge joining engine.

FIG. 10 is a block diagram illustrating an embodiment of a merge joining engine. In some embodiments, merge joining engine 1002 is merge joining engine 706 of FIG. 7. In the example shown, merge joining engine 1002 is configured to communicate with location backend 1004 and tag database 1006 using location backend interfaces 1008 and tag backend interface 1010, respectively. In some embodiments, interfaces 1008 and 1010 are configured to send queries and receive results to/from their respective backend. Although two backend systems/databases are shown, any number of backends communicated with can take place. Additionally, although a location and tag database are shown, backend databases of any type can be queried and their results mediated using the merge joining engine. For example, results from two location backends can be mediated, or, for example, the same backend can be sent two separate queries, with the results from each query mediated.

In some embodiments, sub-query generator 1012 is configured to generate sub-queries to be sent to disparate backends based on a request (that specifies criteria for defining an audience to which a push notification should be sent). For example, suppose Alice specifies an audience for her push notification that was in San Francisco within the past two days and are Bay Area TheRockBand concert attendees. As the request has specified criteria of two types, location (and time) and tag, two sub-queries will be generated. One sub-query will be generated to query the location backend for devices that were in San Francisco within the past two days, and the other sub-query will be generated to query the tag backend for devices that are associated with Bay Area TheRockBand concert attendees.

In some embodiments, a sub-query can be generated from a request by extracting a specified parameter from a request (e.g., San Francisco within the past 3 months, Bay Area TheRockBand concert attendee), determining the type of the parameter (e.g., location, tag, etc.), and generating a sub-query of the appropriate format based on the type of the parameter (e.g., using location bucket query engine 704 of FIG. 7 to query a location bucket index database). In some embodiments, the sub-query generator is also configured to generate sub-queries for requests including Boolean logic operations, as will be described in more detail below. In some embodiments, the generated sub-queries are sent to the respective backends (e.g., using backend interfaces 1008 and 1010).

In some embodiments, merger 1014 is configured to merge results received in response to separate backend queries. In the example shown, merger 1014 includes location buffer 1016, tag buffer 1018, location iterator 1020, tag iterator 1022, and match calculator 1024.

In some embodiments, buffers 1016 and 1018 are configured to receive a subset/batch of results from the results streams provided by their respective associated backends in response to their respective queries. In some embodiments, streams of device identifiers are provided by the backends to be mediated. For example, suppose the location backend returns one million device identifiers. A subset of those results (e.g., a set of one thousand device identifiers) is received by the buffer at a time for processing (which may result in multiple iterations of processing). In some embodiments, the buffers are of the same maximum size, however, a number of device identifiers less than the maximum buffer size can be received (e.g., if there are not one thousand total results returned by a backend). In some embodiments, the results streams from the backends are sorted, for example, sequentially, in ascending device identifier order (or any other appropriate order). In some embodiments, the batches of device identifiers in the buffers are compared against each other to determine matches.

In some embodiments, iterators 1020 and 1022 are configured to determine the subset of device identifiers to be retrieved from a results stream. For example, in some embodiments, an iterator can determine which device identifier the subset/batch should start from. Suppose, for example, that the location backend, in response to its sub-query, returns a stream of ten device identifiers [1, 2, 3, 4, 5, 6, 7, 8, 9, 10], which have been sorted in ascending device identifier order. Suppose also, for example, that the tag backend, in response to its sub-query, returns a stream of five device identifiers [6, 7, 8, 9, 10], which have also been sorted in ascending device identifier order. Now suppose that the buffers each request a subset of three device identifiers. In this example, tag buffer 1018 requests the first three device identifier results from the tag backend [6, 7, 8]. However, because the value of the first device identifier on the tag side is 6, instead of requesting the first three device identifiers from the location backend (i.e., [1, 2, 3]), the location side can be informed, based on where the tag side is, to skip ahead and request for a subset of device identifiers to be retrieved starting from device identifier 6 as well. By doing so, resources do not need to be spent determining if there are any matches on the tag side for devices [1, 2, 3, 4, 5] of the location side, as the smallest device identifier on the tag side is 6. Thus, the iterators can inform each other which device identifiers to skip to in their respective streams when requesting batches of device identifiers so that processing can be performed more efficiently. A more detailed example of merge joining using skipping iterators will be shown below and described in conjunction with FIGS. 12A-12D.

In some embodiments, match calculator 1024 is configured to calculate matching results. In the example shown, match calculator 1024 evaluates the subset of results included in buffers 1016 and 1018 in order to calculate matching devices. In some embodiments, logic (e.g., Boolean logic such as AND, OR, NOT specified in a request) is applied to determine the matches. In some embodiments, merging is done at the location backends as an optimization. For example, if a query requests devices that have been in Chicago or New York City within the past two days, the logical union of the devices matching the location criteria can be determined at the location backend. In some embodiments, however, the location backend can be queried twice, the first time to receive the set of devices that have been in Chicago within the past two days, and the second time to receive devices that have been in New York City within the past two days. The two sets of results can then be merged using the match calculator.

Figure 11:
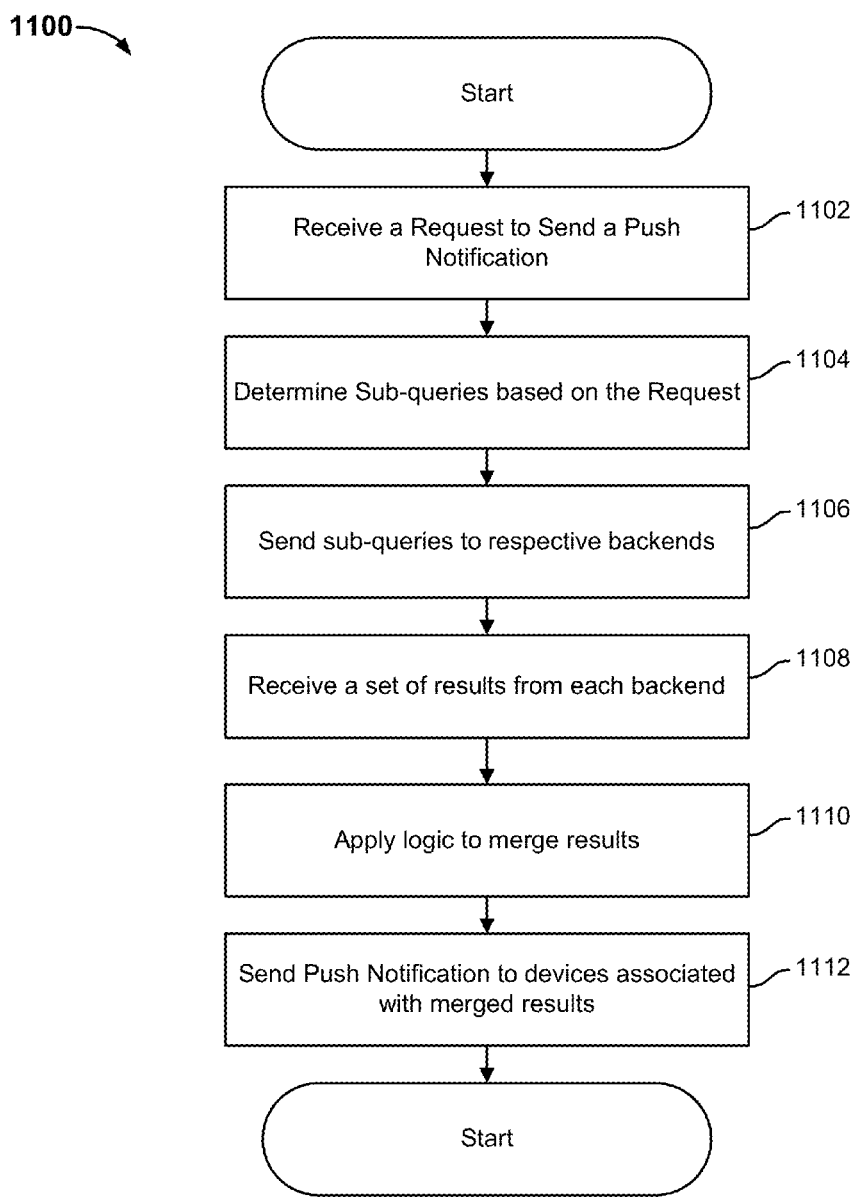
FIG. 11 is a flow diagram illustrating an embodiment of a process for merging results.

FIG. 11 is a flow diagram illustrating an embodiment of a process for merging results. In some embodiments, process 1100 is executed by merge joining engine 1002 of FIG. 10. The process begins at 1102 when a request to send a push notification is received. The request can specify various parameters and criteria, such as location, time, and tags, as well as Boolean logic operations (as will be described in more detail below) operating on the location and tags for defining an audience for content such as a push notification.

At 1104, sub-queries are determined based on the request. In some embodiments, based on the type of parameters specified, sub-queries formatted for backends appropriate to the specified parameters can be generated. For example, if a request specifies users who have been in San Francisco in the past three days and are fans of the Corvids, one sub-query can be made to a location backend for users who have been in San Francisco in the past three days, and a second sub-query made to a tag backend for users who are fans of the Corvids. In some embodiments, as will be described in more detail below, requests which include multiple Boolean operations (which can be nested) can also be broken down into sub-queries for processing.

At 1106, the sub-queries are sent to the respective backends. At 1108, a set of results are received from each of the respective backends. In some embodiments, the results are sorted, for example, in ascending device identifier order. In some embodiments, a subset of the results from the backends is received.

At 1110, logic is applied to merge results. In some embodiments, the received results sets are merged (and matches calculated among the results sets) according to rules/logic (e.g., Boolean logic). In some embodiments, the subsets described above are evaluated against each other to determine matches (e.g., intersection). In some embodiments, other types of Boolean logic operators (e.g., union, exclusion, exclusive, etc.) can be applied to calculate matches satisfying a request for devices. In some embodiments, as described above, when evaluating batches of results against each other, the position of a device identifier on a controlling side of the evaluation can inform the opposing side to skip ahead in its stream of results to retrieve a subset of device identifiers for the next iteration of evaluation, where the starting device identifier of the subset is equal to the device identifier on the controlling side (thus producing a match), or is of the nearest value greater than the device identifier on the controlling side so that processing of intervening devices that are guaranteed not to match is skipped.

At 1112, push notifications are sent to devices associated with the merged results. For example, given the final set of device identifiers resulting from merge-joining, push notifications can be sent to mobile devices corresponding to the device identifiers.

Skipping Iterator

As described above, different streams of device identifier results can be merge-joined by evaluating smaller batches of results over multiple iterations of processing. In some embodiments, as described above, if the different streams of results are first ordered sequentially (e.g., in ascending device identifier value order), efficiencies can be gained. For example, as described above, given that the value of the device identifier in a first batch being evaluated exceeds the maximum device identifier value in the opposing batch, a new batch of device identifiers can be retrieved, but with the batch starting with a device identifier value equal to or greater than the device identifier in the first batch being evaluated. Thus, the opposing side can "catch up" to where the first side is, with the processing of intervening device identifiers skipped over. An example of skipping iteration is shown below.

FIGS. 12A-D are diagrams illustrating an embodiment of skipping an iteration when merge joining two sets of results. In some embodiments, two sets of results are merged according to the techniques described above with respect to FIGS. 10 and 11.

Figure 12A:
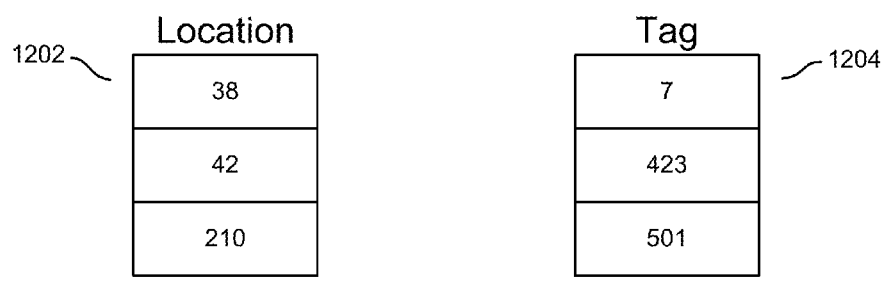
FIG. 12A is a diagram illustrating an embodiment of two batches of results to be merged.

FIG. 12A is a diagram illustrating an embodiment of two batches of results to be merged. In this example scenario, a location backend and tag backend have each been queried, and the results returned from each backend are to be merged to find their intersection (e.g., device identifiers that are common to both sets of results). In this example, each backend has returned a stream of device identifiers that have been sorted in sequential ascending order. At 1202 and 1204, a first batch of the first three device identifiers is received from each stream.

Figure 12B:
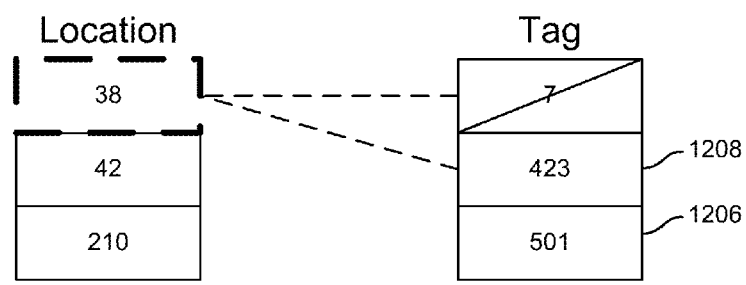
FIG. 12B is a diagram illustrating an embodiment of a comparison of results.

FIG. 12B is a diagram illustrating an embodiment of a comparison of results. Continuing from the example of FIG. 12A, in this example, the comparison of the two sets begins by evaluating the first device identifier in the location batch against the device identifiers included in the tag batch. As the location side is controlling the processing at this point (e.g., it is the device which the remaining identifiers on the opposing side are being evaluated against), the first location identifier will be called the "controlling device identifier" (shown in bold and dotted lines). As the results from the streams have been sorted sequentially in ascending device identifier order, the first location device identifier, with a value of "38," is the smallest device identifier returned on the location side.

In some embodiments, the controlling device identifier (corresponding to value 38 in this case) is first compared against the maximum tag device identifier (1206) on the opposing tag side. If the maximum device identifier on the opposing side is smaller than the controlling identifier being evaluated, then it can be automatically determined that none of the device identifiers on the opposing side will match the controlling device identifier, because they will all be smaller in value. However, in this example, the maximum tag value is 501, which is greater than the controlling location device identifier.

As a match has not been found, and a new batch of tag device identifiers should not be requested, the comparison of the controlling device identifier against the remaining device identifiers on the opposing side continues. The controlling location device identifier is compared to the first tag device identifier, which has a value of 7 and is thus not a match. Additionally, because the devices are sorted sequentially in ascending order, the "7" device identifier on the tag side does not need to be processed in the future. The next device identifier (1208) being compared to on the tag side has a value of 423. At this point, because the tag device identifier is greater than the controlling location device identifier, control passes to the tag side, with the device identifier 423 now becoming the controlling device identifier.

Figure 12C:
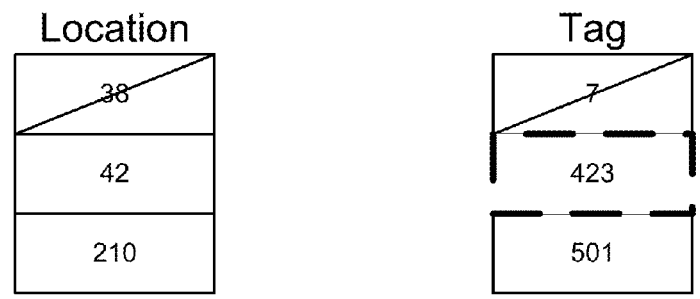
FIG. 12C is a diagram illustrating an embodiment of a comparison of results.

FIG. 12C is a diagram illustrating an embodiment of a comparison of results. Continuing from the example of FIG. 12B, device identifier 423 on the tag side is now the controlling device identifier, and will be evaluated against the remaining device identifiers in the opposing location side. As in the comparison above, the controlling device identifier is compared against the maximum device identifier of the opposing side. In this example, it is determined that the controlling device identifier exceeds the maximum device identifier value on the opposing (location) side, which has a value of 210. It can then be determined that none of the remaining device identifiers in the location batch will be matches and there is no need to process them. Instead, a new batch of results can be requested from the location results stream.

Figure 12D:
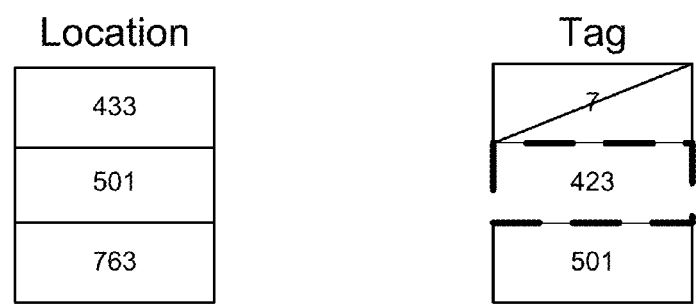
FIG. 12D is a diagram illustrating an embodiment of skipping an iteration.

FIG. 12D is a diagram illustrating an embodiment of skipping an iteration. Continuing from the example of FIG. 12C, a new batch of results from the location results stream has been requested. In this example, the new location batch starts from a device identifier that is based on the value of the controlling device identifier. For example, although the location backend results may include several device identifiers between 210 (previous location batch maximum) and the controlling device identifier value (423), they are all smaller than the controlling device identifier, and thus their processing can be skipped as they are guaranteed to not be matches. Instead, a new batch starting with the value equal to or larger than the controlling device identifier is returned so that the location side can "catch up" to the position of the tag side in the comparison. The comparison can then continue to determine matches among the batches. For example, eventually, a match will be found for device identifier 501, which is found in both sides of the merge.

Boolean Logic Audience Segmenting

In some embodiments, Boolean logic operations can be specified when defining an audience to receive a push notification. For example, Boolean tag logic can be used to group/filter devices based on associated tags. In some embodiments, the Boolean logic operations allowed include AND, OR, NOT (e.g., intersection, union, exclusion, respectively). Other Boolean logic operations, such as XOR can also be specified. In some embodiments, the request includes nested Boolean logic operations.

Figure 13:
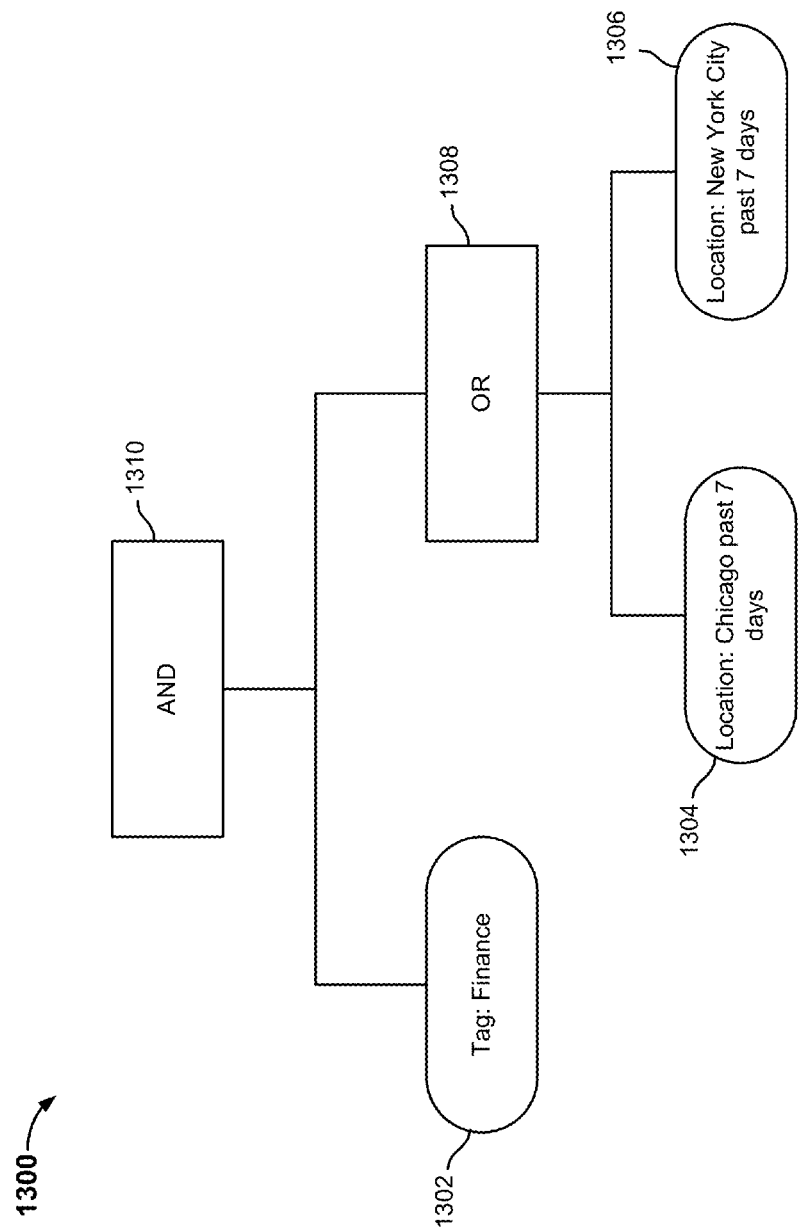
FIG. 13 is a diagram illustrating an embodiment of a tree representation of an audience definition including Boolean logic.

FIG. 13 is a diagram illustrating an embodiment of a tree representation of an audience definition including Boolean logic. In some embodiments, the tree is a hierarchical structure representing the logical organization of the Boolean logic operations used to define an audience. The structure can have multiple levels, for example, to represent nested Boolean logic queries. In this example, tree representation 1300 is an example representation of a request for users that have been tagged as interested in 'finance' and that have been in either the location of Chicago or New York City in the past 7 days. In some embodiments, the publisher's request can be logically expressed as follows: (tag: 'finance' AND (location: Chicago past 7 days OR location: New York City past 7 days)).

In some embodiments, the request for devices matching the Boolean logic operations on locations and tags can be converted into a hierarchical tree structure, which can in turn be broken down (e.g., using sub-query generator 1012 of FIG. 10) into a set of sub-queries according to the organization of the Boolean logic queries.

For example, the leaf nodes (1302, 1304, and 1306) can represent separate sub-queries to various backend databases that return the operands for the various operations. The results of the sub-queries can then be merged (e.g., using match calculator 1024 of FIG. 10 or at the backend itself) by applying Boolean logic (e.g., Boolean logic operators to corresponding operands) in order to satisfy the Boolean operations in the request. For example, given the nested Boolean OR operation for devices in Chicago or New York City within the past 7 days, sub-queries can be made to return devices that were in Chicago in the past 7 days as well as those that were in New York in the past 7 days (e.g., by generating queries by converting the location criteria into location bucket keys, as described above). Given that the Boolean logic operation for the two locations is an OR operation (1308), a logical union can be applied to merge the results sets (with duplicates removed), satisfying the nested Boolean logic operation. Now that a new set of results has been calculated for the nested Boolean operation, the new set of results can then in turn be merged with results from the query of the tag backend for devices tagged with 'finance,' to satisfy the Boolean logic operation specified one level up in the tree structure. The two sets can be merged by applying logic that merges the two results sets by calculating their intersection (AND 1310), producing a final result set of device identifiers matching the original audience definition request.

In some embodiments, the tree representation of the Boolean logic audience definition can be of arbitrary depth, based on the level of nesting of Boolean logic operations specified. In some embodiments, the sub-queries can be performed serially or in parallel (e.g., using multiple merge join engines), with the order of sub-queries and merge joining depending on the depth of the operation (e.g., begin with lowest depth Boolean logic operations and work upwards towards the root of the tree).

FIG. 14 is a diagram illustrating an embodiment of a code representation of an audience definition including Boolean logic. In some embodiments, representation 1400 is a representation of the request described in FIG. 13, that defines an audience that is interested in 'finance' and has been in either Chicago or New York City within the past 7 days. In the example shown, Boolean logic operation 1402 corresponds to a sub-request for devices that match the location criteria of having been in Chicago OR New York City within the past 7 days. The results of the Boolean logic operation are then 'AND'ed with the devices matching the tag criteria 'finance.'

Figure 15:
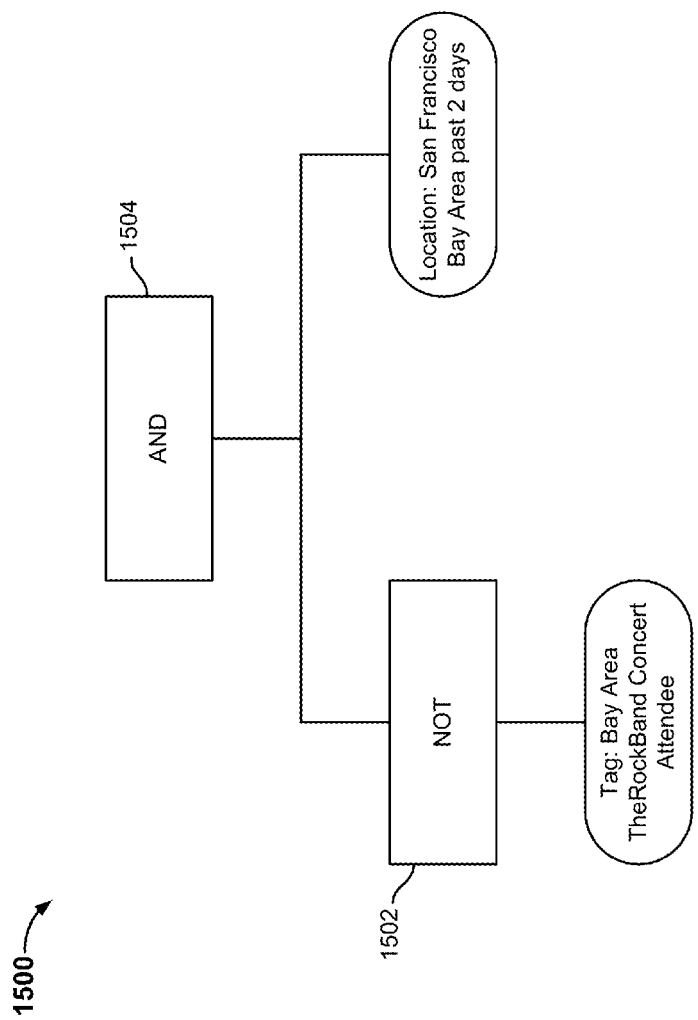
FIG. 15 is a diagram illustrating an embodiment of a tree representation of an audience definition including Boolean logic.

FIG. 15 is a diagram illustrating an embodiment of a tree representation of an audience definition including Boolean logic. In the example shown, an event organizer wishes to drive last minute ticket sales to people in the San Francisco Bay area who have not yet bought a ticket to a TheRockBand concert. In some embodiments, query tree 1500 is a tree representation of a request that can be expressed as follows: ((NOT Tag: Bay Area TheRockBand Concert Attendee) AND (Location: San Francisco Bay Area past 2 days)). In this example, the "NOT" exclusion operation (1502) can be used to filter results when querying a tag backend for devices that have not been tagged as "Bay Area TheRockBand Concert Attendee." For example, all devices excluding devices tagged as "Bay Area TheRockBand Concert Attendee" can be included in a set of results that is merged with the set of devices found to have been in the San Francisco Bay Area within the past two days (which was returned in response to querying the location backend) by applying intersection logic (AND 1504) to calculate matches.

FIG. 16 is a diagram illustrating an embodiment of a code representation of an audience definition including Boolean logic. In some embodiments, representation 1600 is a code representation of the tree representation 1500 of FIG. 15. The corresponding Boolean "NOT" exclusion operation is shown at 1602 and the Boolean "AND" intersection operation is shown at 1604.

Defining an Audience as Specified in a Polygon

Suppose Alice, the digital marketer, would like to send a message, during halftime of the Superbowl, to Corvids fans that are physically in the stadium where the game is taking place. As will be described below, Alice can interact with a user interface to define her target audience segment by specifying criteria such as where users are/have been (e.g., Superdome where the Superbowl is taking place within the last 90 minutes), their characteristics (e.g., tagged as Corvids fans), etc. In some embodiments, Alice can be provided an interface and presented polygons that when selected, can be used to define the audience to which Alice's push notification will be sent.

Figure 17:
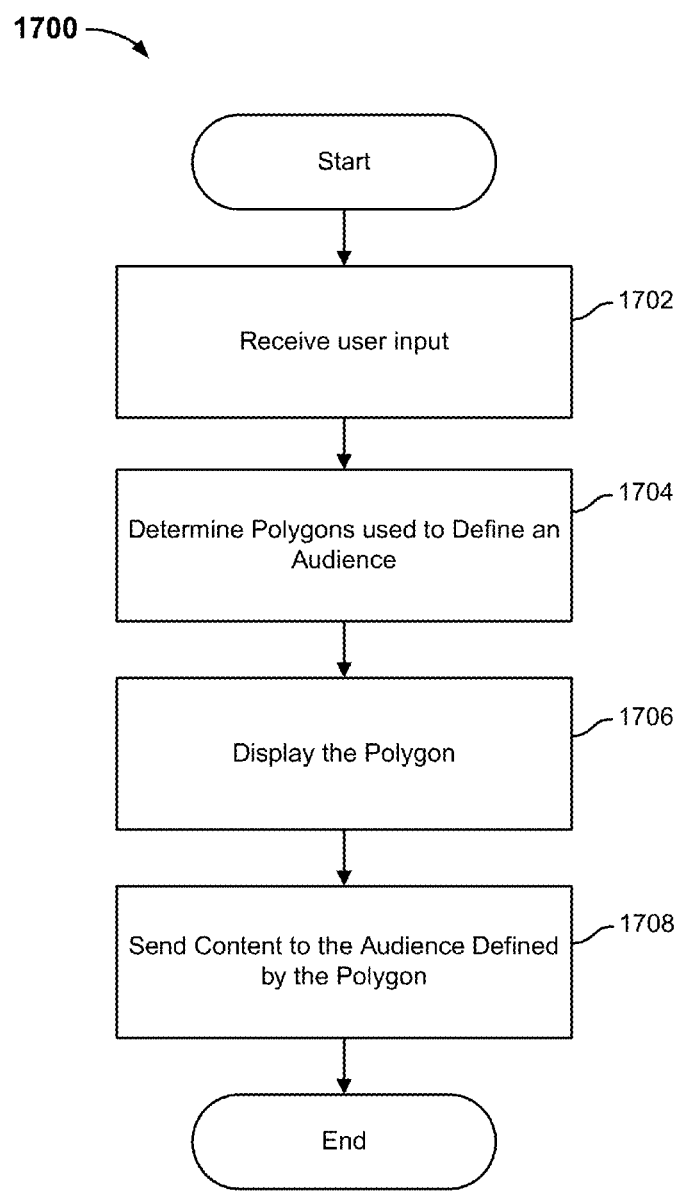
FIG. 17 is a flow diagram illustrating an embodiment of a process for defining an audience as specified in a polygon.

FIG. 17 is a flow diagram illustrating an embodiment of a process for defining an audience as specified in a polygon. In some embodiments, process 1700 is executed by audience definition engine 218 of FIG. 2. The process begins at 1702 when user input is received. In some embodiments, the user input is received via a web interface. For example, when specifying a location to which to send a push, the user can input the name of a location they are interested in (e.g., ZIP code 94123, San Francisco) or enter a latitude/longitude. In some embodiments, the user is presented with a list of location and/or polygon names from which the user can select. The candidate location and/or polygon names can be listed through drop down menus and sorted by different dimensions, such as state, country, county, etc. In some embodiments, the list of candidate location and/or polygons that a user has access to can be restricted based on permissions levels. For example, if there are custom polygons for particular customers, permissions can be set so that other customers do not have access to the custom polygons. In some embodiments, input can be received that is associated with exploration/navigation (e.g., panning, zooming, sliding, etc.) of a map such that a user can locate an area of interest on a map. In some embodiments, a combination of the above inputs can be received.

At 1704, a polygon used to define an audience is determined. In some embodiments, the audience to be defined is a segment of devices to which content, such as a push notification, is to be sent. In some embodiments, the polygon used to define the audience is determined based on the received user input. For example, the polygon can be determined based on the input by a user for the polygon by name (e.g., ZIP code 94123 or San Francisco City). A polygon with a name/identifier matching that of the user input can be identified. In some embodiments, the polygon is identified using a directory matching polygons with names. In some embodiments, if the user input includes a latitude/longitude, the latitude/longitude can be converted into one or more polygons that are determined to surround the latitude/longitude (e.g., using polygon selection engine 306 of FIG. 3). If the user has selected a location/polygon name from a list, the polygon associated with the selected names can be retrieved.

In some embodiments, the polygons used to define the audience are determined based on user exploration/navigation of a map. For example, when defining the audience by specifying a location, the user can explore a map (e.g., via a browser). The portion of a map currently being rendered to a user (e.g., map in rectangular frame of the browser) can be associated with a bounding box. In some embodiments, the bounding box is represented using a set of coordinates and additional information (e.g., coordinate for bottom left point or center of the bounding box and additional information describing the length and width of the box). The coordinates defining the bounding box can change as the user explores the map. Based on the portion of the map that the user is currently exploring, the coordinates of the box bounding the area being explored can be received (e.g., from a browser that the user is interacting with) and used to determine polygons that fall partially or completely within the bounding box (e.g., using polygon selection engine 306 of FIG. 3). For example, a given bounding box including the west coast of the United States could include polygons for the states of California, Oregon, and Washington. The polygons determined can change based on panning by the user of the map in the bounding box. In some embodiments, the polygons that are determined are based on the zoom level of the exploration/navigation. For example, polygons on a scale that is appropriate relative to the zoom level are determined/retrieved. For example, if a user is zoomed out completely on a map of the world, only polygons at the granularity/precision of continents can be determined/retrieved, while polygons at smaller granularities/precisions (e.g., city neighborhoods) are not determined/retrieved.

At 1706, the determined polygons are displayed. For example, a graphical representation (e.g., shaded in outline) of the boundaries of the determined polygons can be displayed on a map rendered in a web interface that the user is interacting with.

In some embodiments, an indication that a displayed polygon should be applied for defining the audience segment is received. For example, as Alice explores a map, the polygons determined to be included in the area that Alice is viewing can be displayed, and Alice can select a polygon that is of interest to her by clicking on the rendered representation of the polygon on the map.

In some embodiments, criteria other than location used to define an audience can also be received. For example, in addition to location, a historical time period of when the audience should have been at a location specified by a user can also be received. Additionally, input associated with Boolean logic operations on tags, location, and time specified by a user can also be received. In some embodiments, if a time period is not specified, a default time period can be selected.

In some embodiments, based on the received specified criteria, a preview of the audience defined by the specified criteria can be displayed. For example, the number of devices satisfying the criteria can be presented to the user.

In some embodiments, the set of specified criteria used to define a particular audience segment is stored. For example, the set of specified criteria associated with the segment can be named and stored and retrieved at another time so that further content can be sent to the previously defined segment.

At 1708, content, such as a push notification, can be sent to the defined audience. In some embodiments, the content is sent after receiving confirmation by a user that the audience defined by a displayed polygon and other criteria is the intended audience for the content.

Figure 18A:
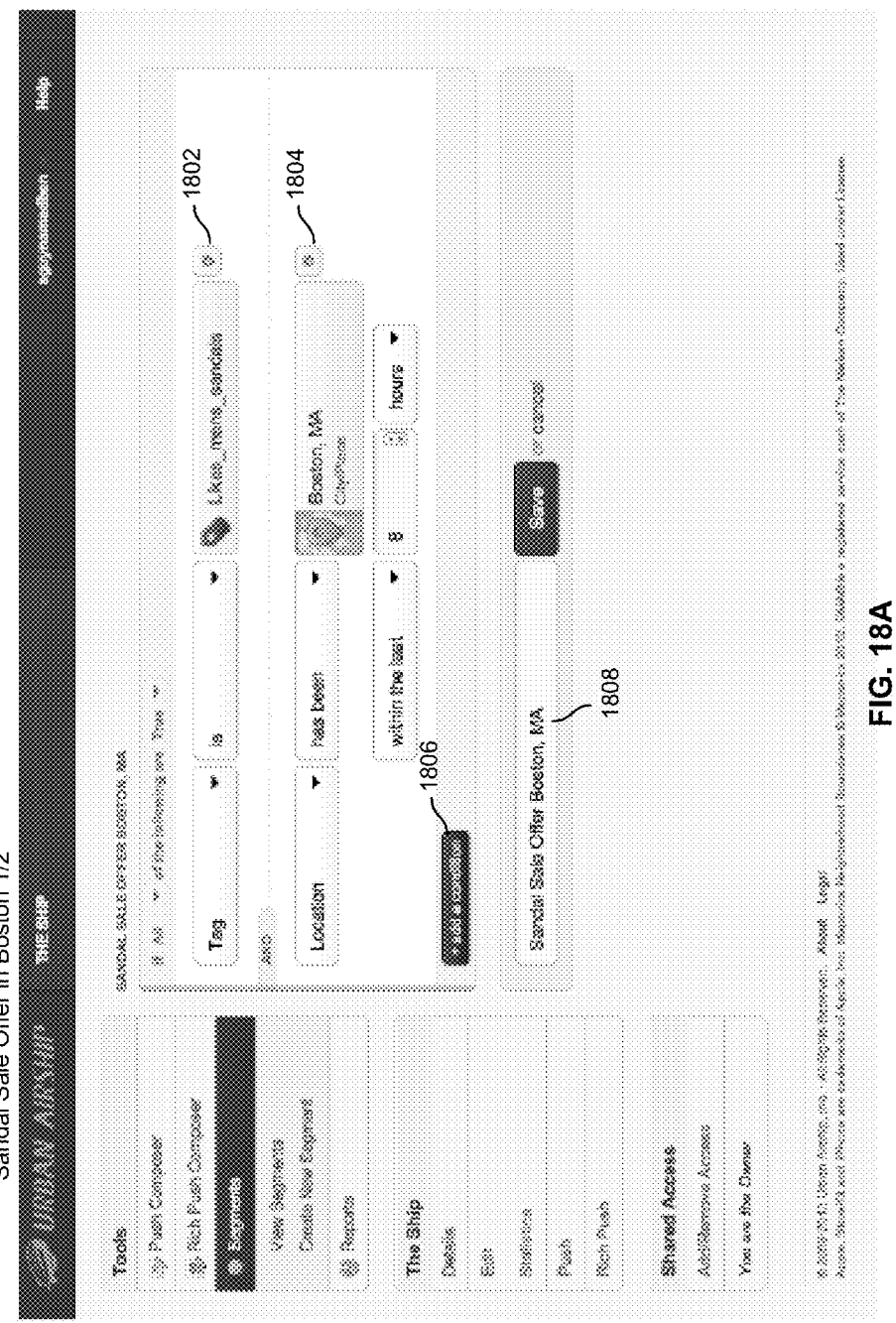
FIG. 18A is a diagram illustrating an embodiment of an interface for defining an audience.

FIG. 18A is a diagram illustrating an embodiment of an interface for defining an audience. In this example, a publisher wishes to define an audience segment to receive a message about a sandal sale offer in Boston. At 1802, a tag criterion "Likes mens sandals" is specified. At 1804, the criterion for the location (Boston, Mass.) in which the audience should previously have been is specified. At 1806, the criterion for the time period within which the audience should have been at the specified location is further specified. At 1806, further condition and criteria can be specified. At 1808, the name of the segment can be specified (e.g., for storage).

Figure 18B:
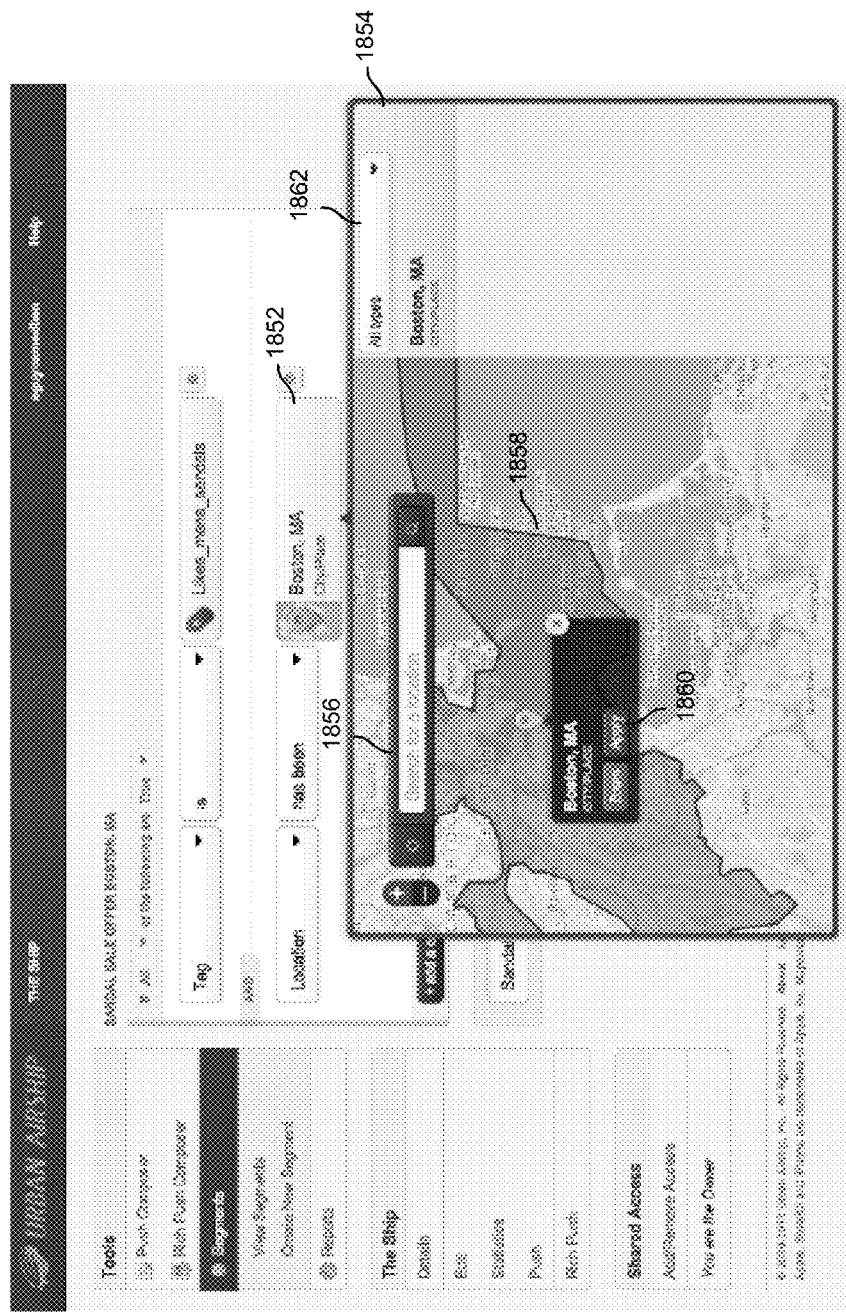
FIG. 18B is a diagram illustrating an embodiment of an interface for defining an audience.

FIG. 18B is a diagram illustrating an embodiment of an interface for defining an audience. In this example, selection of a location is shown. Continuing from the example of FIG.

18A, a user has selected to view the location "Boston, Mass." (1852) on a map. At 1854, in response to the user's request, a map that is scaled and zoomed in appropriately to include the polygon for Boston, Mass. is displayed. In the example shown, the name of a location can be searched for by entering information in the text box at 1856. For example, the name of a city, county, zip, country, address, etc. can be entered. At 1860, an option to apply the location or to further zoom in to the polygon is presented. The user can also pan through the map (e.g., by sliding the map in the bounding box). As described above, in some embodiments, the polygon(s) (e.g., Boston, Mass. polygon shown at 1858) determined to be displayed in the map is commensurate to the scale (or zoom level) of the map being displayed. At 1862, types of polygons can be specified for display (e.g., determine and display polygons of cities, counties, neighborhoods, ZIP codes, etc.).

Figure 19:
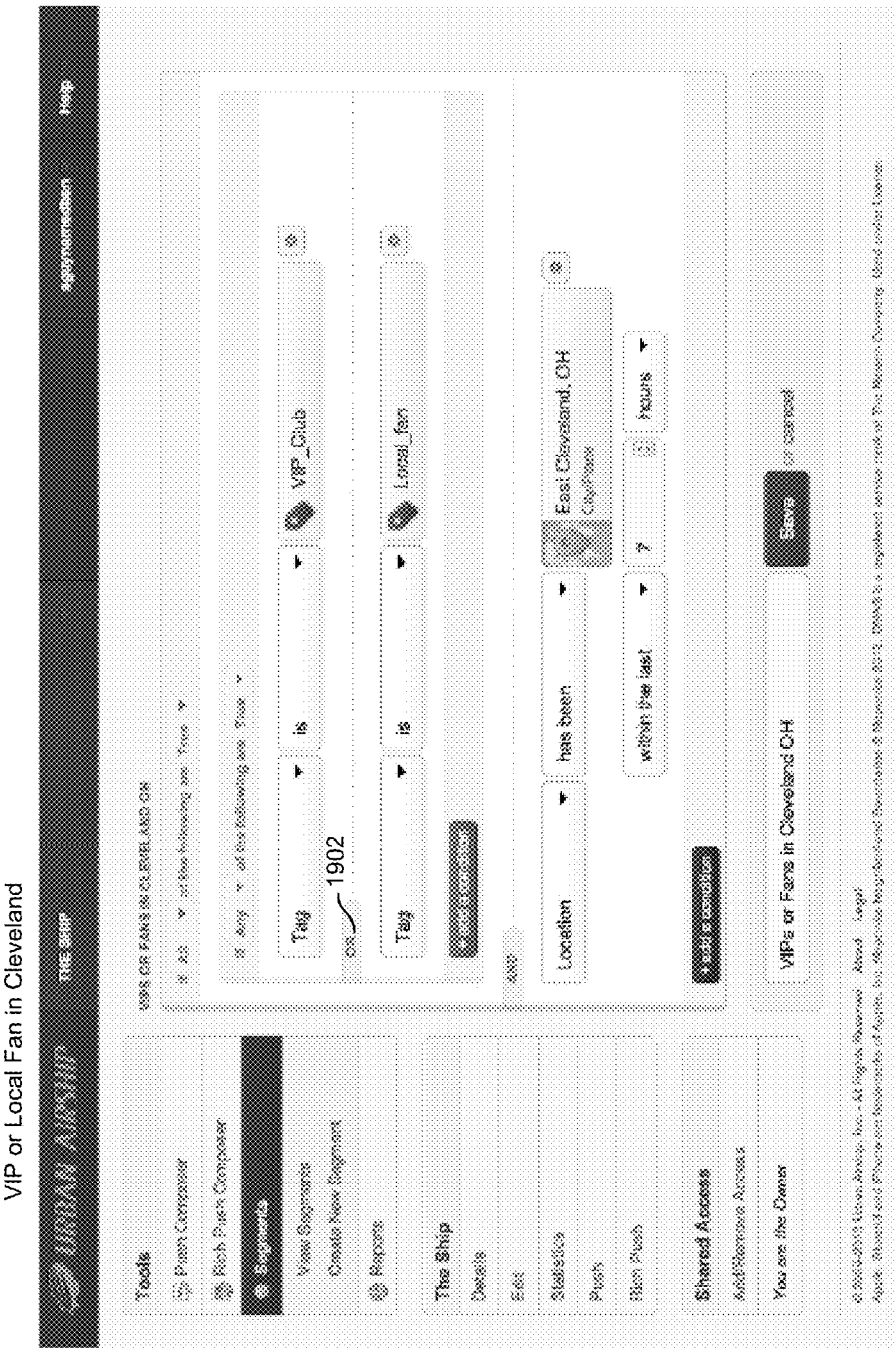
FIG. 19 is a diagram illustrating an embodiment of an interface for defining an audience.

FIG. 19 is a diagram illustrating an embodiment of an interface for defining an audience. In the example shown, Alice would like to define an audience that is either a VIP or local fan in Cleveland. Given the query, Alice has specified two tags of interest, 'VIP_Club' and 'Local_fan.' At 1902, the Boolean logic operation (OR) to be used on the tags of interest can be specified.

Figure 20:
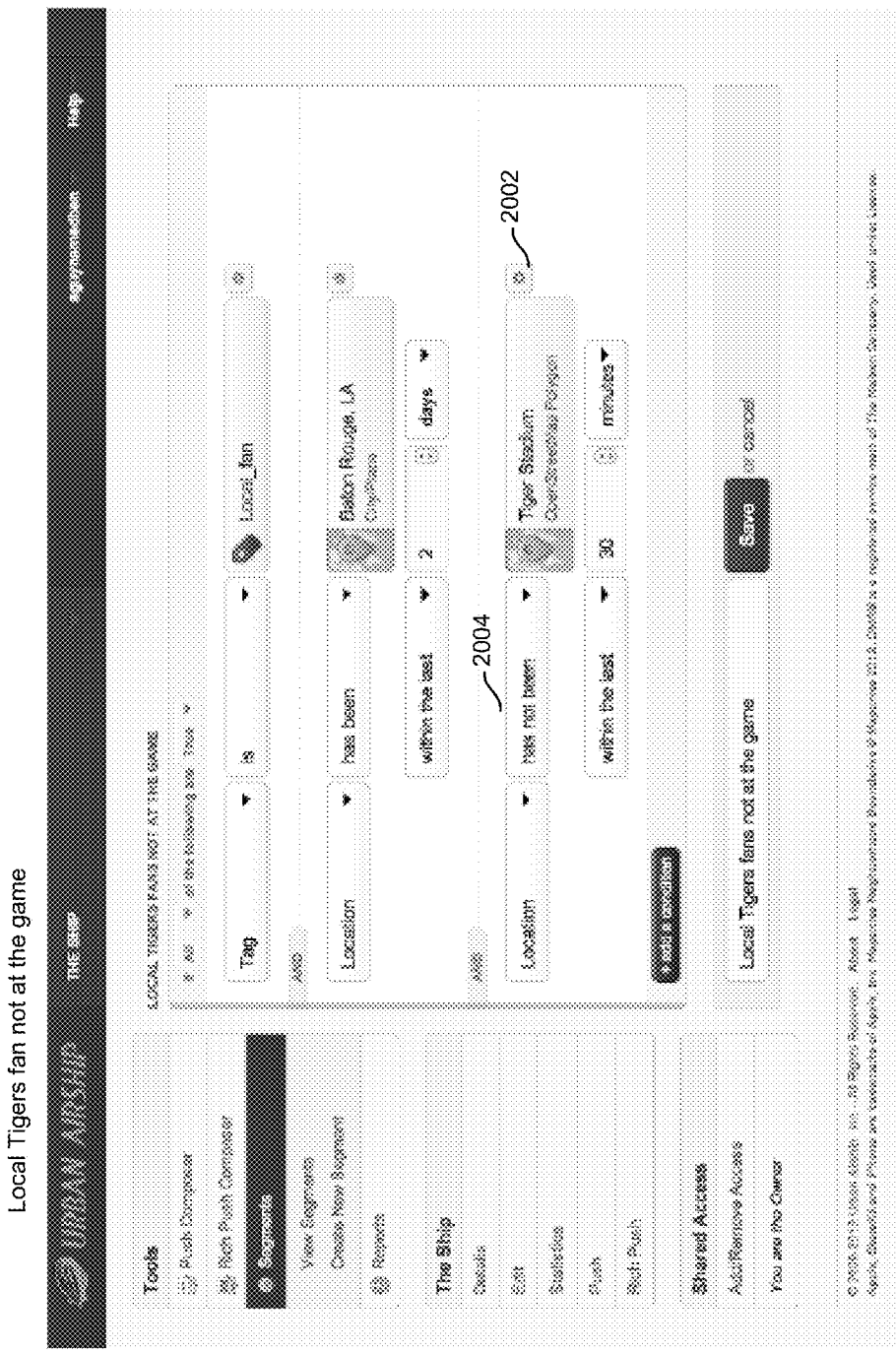
FIG. 20 is a diagram illustrating an embodiment of an interface for defining an audience.

FIG. 20 is a diagram illustrating an embodiment of an interface for defining an audience. In the example shown, Alice would like to define an audience of local Tigers fans not at the game. In order to satisfy the request, at 2002, Alice specifies the location, "Tiger Stadium" (which is an OpenStreetMap polygon) but, at 2004, Alice also specifies the exclusion operation in conjunction with Tiger Stadium, so that a "Local_fan" at the Tiger Stadium will be excluded from being sent a push notification.

Reporting Push Analytics and Push Response Engagement

In this example, suppose that Alice, the digital marketer, is in charge of a messaging campaign for a mobile sports application. Using the techniques described below, Alice can access quantitative data about her mobile application and how users respond to her messaging campaigns. In various embodiments, Alice can monitor information such as how many users opened their messages, what days and times received the largest response, how long users were in the application, and how those activities and events correlate to push notifications that Alice sent. Thus, Alice can better understand the relationship between push notifications and user engagement so that she can refine her mobile campaign to increase relevance, user engagement (e.g., achieve optimal response to push notification), etc.

Figure 21:
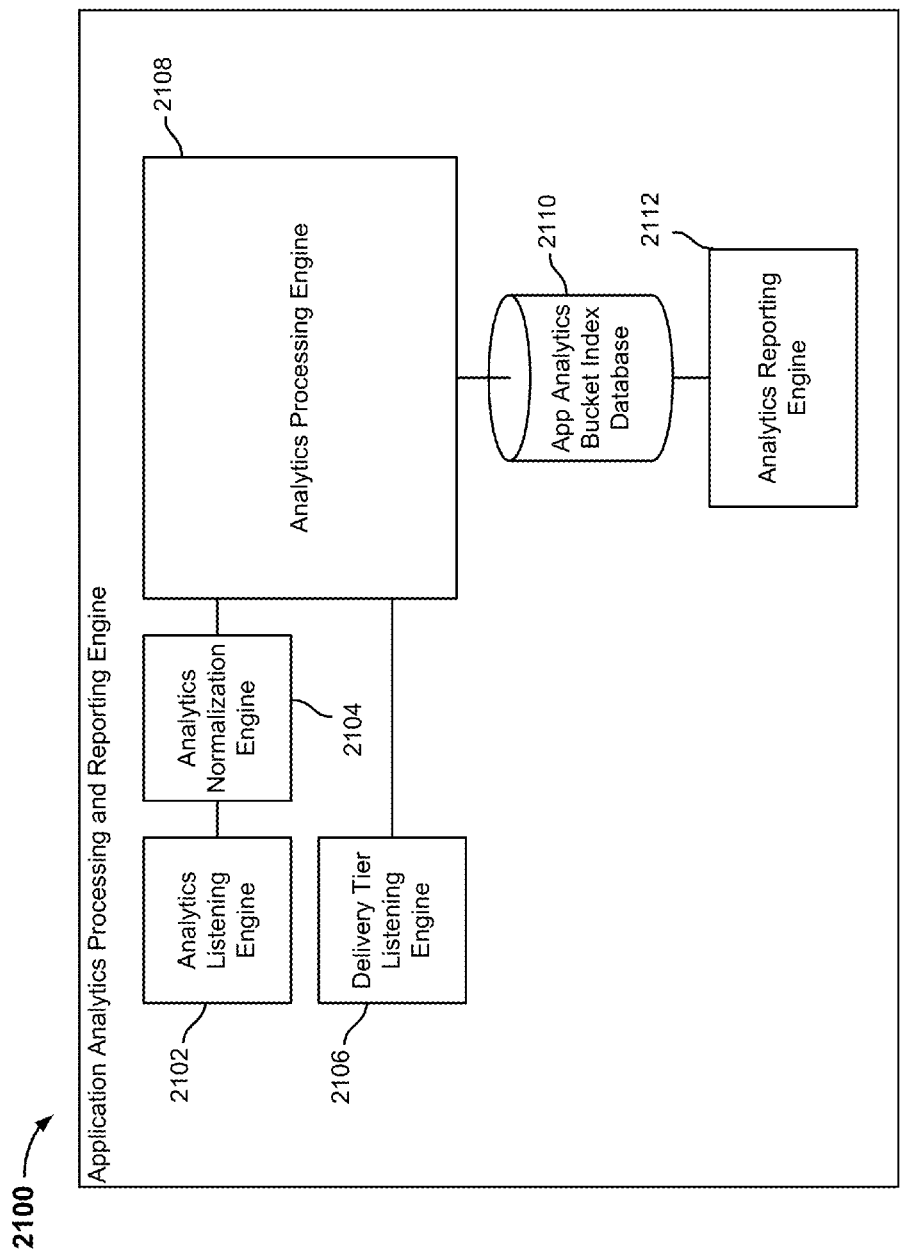
FIG. 21 is a block diagram illustrating an embodiment of an application analytics processing and reporting engine.

FIG. 21 is a block diagram illustrating an embodiment of an application analytics processing and reporting engine. In some embodiments, application analytics processing and reporting engine 2100 of FIG. 21 is used to implement application analytics processing and reporting engine 214 of FIG. 2. In the example shown, application analytics processing and reporting engine 2100 includes analytics listening engine 2102, analytics normalization engine 2104, delivery tier listening engine 2106, analytics processing engine 2108, application analytics bucket index database 2110, and analytics reporting engine 2112.

In some embodiments, analytics listening engine 2102 is configured to receive analytics information (e.g., from device updates received by device update listening engine 202 of FIG. 2). As described above, device updates can include application analytics information including information associated with application events, such as timestamps for application open events (e.g., applications opened by user on a device) and application close events (e.g., applications closed by user on a device). In some embodiments, location information (e.g., coordinates of location observed when analytics information was collected) is also received.

In some embodiments, analytics normalization engine 2104 is configured to normalize received application analytics information. In some embodiments, normalizing analytics information includes performing corrections and clean-up to received data to prepare them for processing (e.g., so that they do not cause downstream processing to crash or fail). For example, some phones can have faulty batteries, which can lead to incorrect dates and times on the system of a mobile device. This can lead to incorrect timestamps for the application open and close events. In some embodiments, the incorrect timestamps for the application events are corrected to an estimated correct/plausible time. In some embodiments, normalization includes accounting for and remedying corrupt data (e.g., correcting, removing, etc.). For example, due to an operating system or transmission error, a character in the device update payload can become corrupted, and if left untouched, can cause issues with further downstream processing of the information (e.g., process crashes, etc.).

In some embodiments, delivery tier listening engine 2106 is configured to receive information associated with sent push notifications. For example, information about the push, such as when it was sent, which devices it was sent to, etc. can be collected/received from a delivery tier such as deliver engine 212 of FIG. 2.

In some embodiments, analytics processing engine 2108 is configured to process analytics information. For example, the normalized analytics information can be processed along with collected push notification information. In some embodiments, as will be described in more detail below, analytics processing engine 2108 is configured to extract features (e.g., application 'open' events, 'close' events, etc.), index the features, determine hard conversion/soft conversions, determine metrics (e.g., push influence), infer locations of users from location information (e.g., received from a location database such as location bucket index database 206 of FIG. 2 or location information from device updates), etc.

In some embodiments, application analytics bucket index database 2110 is configured to store analytics information, derived quantitative metrics (e.g., push engagement, decay rate, etc.), etc. In some embodiments, as will be described in more detail below, analytics information such as application open events are stored in buckets, similar to the location buckets described above.

In some embodiments, analytics reporting engine 2112 is configured to generate reports. In the example shown, analytics reporting engine 2112 can use information obtained from application analytics bucket index database 2110 to generate reports. In some embodiments, the reports are pre-configured. For example, a user can have the option to select from a variety of template reports, which are then generated by looking up values in the analytics database. In some embodiments, the reports are generated on-demand. As will be described in more detail below, a variety of reports can be generated. For example, for a given application, a report can be generated that plots a histogram of the number of devices that opened the application in the hours after a push notification was sent. Using the information, the effectiveness of the push notification can be measured and displayed. Additionally, the analytics information can be used to report on A/B testing for different push notifications. For example, two different push notifications can be sent to sample populations and the number of application opens measured to determine which push notification has better results in user engagement (e.g., more application opens), which can then be reported to a user. The reports can also be used to present information about user engagement and predict the effectiveness of a push notification in driving people to open an application. For example, the historical information about the number of application openings performed subsequent to receiving a push notification can be compared to a predicted baseline for the number of application openings there would be in the absence of the push notification. Examples of reports will be discussed in more detail below.

In some embodiments, the generated reports provide information associated with responses to push notifications. For example, the reports can present overall push-related activity, including all application opens and all push notifications sent. In some embodiments, a graph/histogram/number of direct response opens (e.g., hard conversions where users opened the application directly from the push notification) can be shown. As another example, a graph/histogram/number of influenced opens, including direct response opens (e.g., hard conversions) and users who opened the app as a result of receiving the push notification (e.g., soft conversions) is reported. In some embodiments, the metrics reported can be collected for a period of time specified by a user (e.g., all activity and metrics for the last twenty-four hours).

Figure 22:
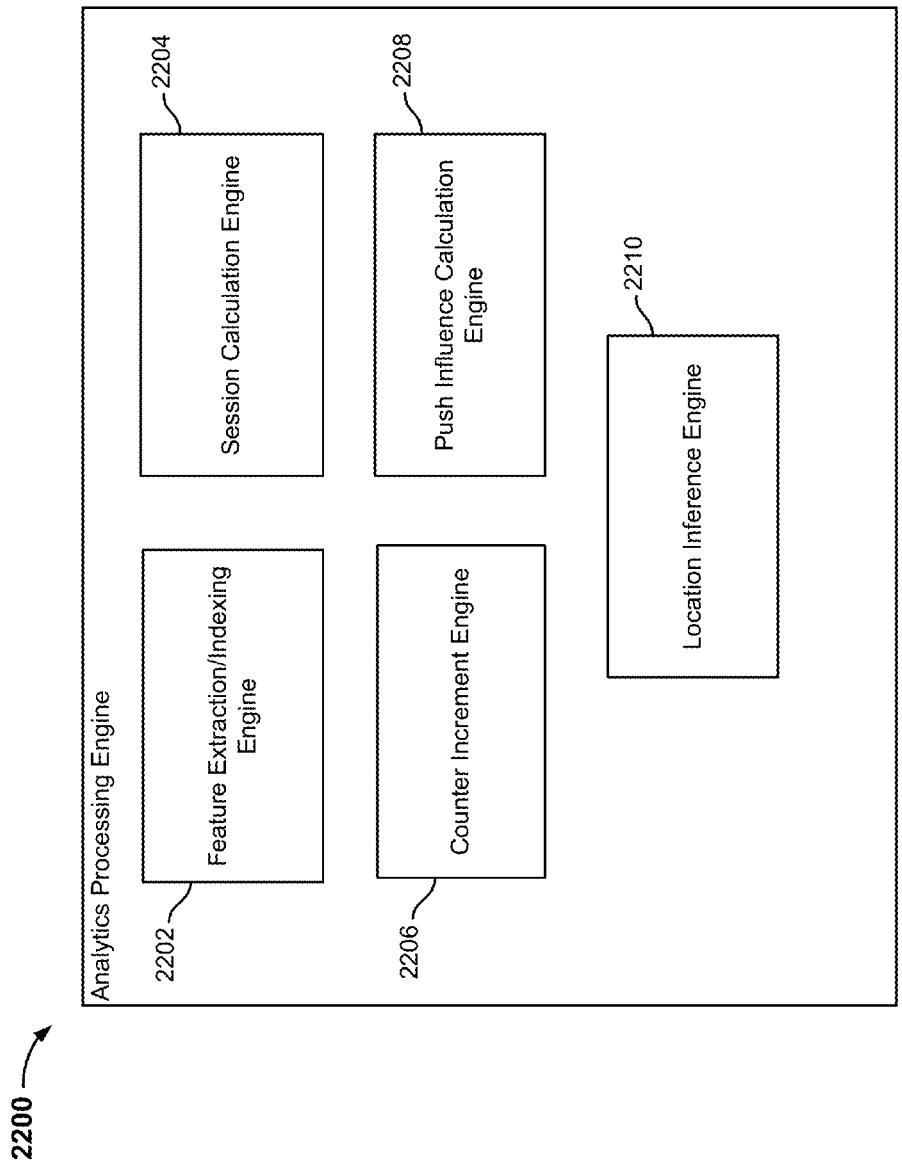
FIG. 22 is a block diagram illustrating an embodiment of an analytics processing engine.

FIG. 22 is a block diagram illustrating an embodiment of an analytics processing engine. In some embodiments, analytics processing engine 2200 of FIG. 22 is used to implement analytics processing engine 2108 of FIG. 21. In the example shown, analytics processing engine 2200 includes feature extraction/indexing engine 2202, session calculation engine 2204, counter increment engine 2206, push influence calculation engine 2208, and location inference engine 2210.

In some embodiments, feature extraction/indexing engine 2202 is configured to extract features from received information and index the features. For example, features include meta information such as carrier, operating system, etc. as well as application events, such as application open events, application close events, or any other appropriate application event. In some embodiments, for a given user (identified by their device identifier), application events can be recorded in timelines, which track when the application event occurred (e.g., according to the event's corresponding timestamp). In some embodiments, a timeline is maintained for each feature (e.g., timeline for application opens, timeline for application closes, etc.). For example, an application open event can be recorded by placing it in the user's timeline for application open events. In some embodiments, each user has their own set of timelines (e.g., each user is associated with their own application open timeline, close timeline, etc. separate from the timelines of other users). Examples of timelines are shown below.

In some embodiments, features are indexed into buckets. In some embodiments the buckets are associated with different time granularities/precisions/slices, similar to the location-time buckets described above, and the techniques described above adapted accordingly. For example, application open events can be recorded by indexing them by time bucket (e.g., insert application open event identifier into appropriate time buckets). As another example, time buckets can be created to index application events by feature and time. For example, the operating system feature identifiers for different operating systems (e.g., iOS, Android, Windows phone, Blackberry, or any other appropriate operating system/platform) associated with open events can be inserted into time buckets so that a digital marketer, such as Alice, can view reports on how Android users opened their applications over time as compared to iOS users. Time buckets for other features (e.g., carrier, etc.) can also be created to index the application open events by feature and time. In some embodiments, the features can be inserted into a common set of time buckets. In some embodiments, features can also be indexed according to geolocation (e.g., index application open events by where they occurred using received location information and insert them into appropriate geolocation buckets). By doing so, a digital marketer such as Alice can view, for example, application open events by location (e.g., users that opened the application in California). In some embodiments, location information for pushes can also be indexed. For example, pushes can be indexed by the location to which they were sent (e.g., to view the number of push notifications that were sent to California).

In some embodiments, session calculation engine 2204 is configured to calculate session lengths. In some embodiments, session lengths are the time a user spent in an application (e.g., the duration for which the application was opened for). In some embodiments, the session period lengths are calculated using the information inserted in the timelines described above. In some embodiments, calculating session period lengths includes retrieving the open and close events (and associated times of the events) for a particular user, and calculating the session lengths by calculating differences between pairs of open and close events. In some embodiments, based on the retrieved open and close events, inconsistencies can be determined. For example, in one scenario, it can be determined that instead of each open event being followed by a close event, a situation can arise in which two open events were retrieved, but no intermediary closing was found (this can be due to events being lost in transport, for example, due to poor reception, the phone dying, the application crashing, etc., or because the events were not logged in a device update because there were too many items in the finite queue/buffer for information to be included in a device update, so an event is "dropped"). The inconsistency can be remedied by approximating open and close events so that session lengths can be calculated. In some embodiments, calculated session times can be inserted into time buckets as well and used, for example, to generate a report on the time-in app over the course of several hours after a push was received.

In some embodiments, counter increment engine 2206 is configured to increment counters associated with application events. In some embodiments, the counters are associated with time granularities/precisions/slices, and the appropriate counters are updated based on the observation time of an event. In some embodiments, the counters can be associated with buckets. For example, suppose an open event was found to have occurred at 13:45 on Nov. 21, 2013. The application open event can be inserted into buckets corresponding to different time precisions, such as "2013," "November 2013," "Nov. 21, 2013," Nov. 21, 2013 13:00 hours," and "Nov. 21, 2013 13:45." Each bucket can also be associated with a corresponding counter, which is incremented when a new event is inserted/indexed into a bucket. For example, counters for the five buckets described above can be incremented by one to account for the new open event being indexed. Counters for other features can also be created and incremented. For example, counters can be instantiated for features such as an operating system. For example, a counter for the iOS feature can be incremented when devices have had application open events added to them. The operating system can also be tracked over time (e.g., time buckets for iOS feature, where iOS identifiers are included in a bucket). By doing so, a marketer such as Alice can compare the effectiveness of an iPhone push notification versus an Android push notification over time if desired.

In some embodiments, push influence calculation engine 2208 is configured to calculate the influence of a push notification on user behavior, such as causing a user to open an application. Over time, many application open events can be received, but only a subset of the application events may actually have been due to a push notification being received, versus another influence, such as cross channel marketing. In some embodiments, determining the influence of a push notification includes determining a measure of the response due to the push notification. In some embodiments, determining the influence of a push notification includes determining a metric that is an estimate of the effectiveness of a push notification. The influence of a push notification can be determined based on historical data (e.g., when push notification was sent, how many application opens occurred subsequent to push notification and when, etc.). In some embodiments, push notification influence is determined as a function of time (e.g., to determine a decay rate of the influence of a push). For example, it can be determined that the longer it has been since the push notification has been received, the less likely it is that a user will open the mobile application associated with the push notification. In some embodiments, the push notification influence is determined using machine-learning techniques, for example, to isolate the influence of a push notification on an application open from other external influences (e.g., user opened app for reasons other than a push notification being received), such as time of day (e.g., people are more likely to look at applications at lunch), cross-channel marketing (e.g., emails associated with an application cause people to open application), etc. In some embodiments, determining push influence includes estimating, for a set of application open, the number or proportion of application opens that can be attributed to the push notification. In some embodiments, determining the push influence includes determining a baseline of open events, which can include a calculation/estimate of the number of application opens that would have occurred in the absence of the push notification being received. The determination of a baseline is described in more detail below with respect to soft conversions.

In some embodiments, determining the influence of a push notification is based on a measure of the conversion of push notifications into application opens. In some embodiments, conversions of a push notification into an application open are tracked/determined. The conversions can be split into two types, hard conversions and soft conversions. Hard conversions are direct responses to push notifications that result in application opens (e.g., user explicitly clicked on push notification, which resulted in application opening). The hard conversions can be logged on a device as occurring (e.g., counted), and sent as part of a device update. The hard conversion can be hashed with a value associated with a push notification, so the exact push notification that was converted directly into an application open can be determined (e.g., without looking up the push notification that occurred at a time close to the application open event).

Soft conversions are application opens that were not converted directly from a push notification, but can be attributed to and were influenced by the push notification. For example, in some embodiments, a push notification cannot be explicitly clicked on, but instead includes a badge that indicates that a message is waiting on the application. This can lead to users opening the application, but the application open was not a result of a direct response to the push notification. As another example, the user may see the push notification, but because they are at work, not open the application until they get home, which may be several hours after the push notification was received, and which by that time, may have disappeared from the screen (but left a badge indicating a message was waiting on the application). In some embodiments, soft conversion is estimated using a model applied to historical data, which is described in more detail below.

In some embodiments, using tracked hard conversions, calculated soft conversions, and historical data, a measure of push influence (e.g., push effectiveness over time) can be determined for a push notification.

In some embodiments, location inference engine 2210 is configured to infer salient locations of interest to users. In some embodiments, the location inference engine is configured to determine salient locations of interest for a user based on user behavior (e.g., application open events) that are indexed by geolocation (e.g., using feature extraction/indexing engine 2202). The historical user behavior information, accumulated over time, can then be analyzed to determine geolocation hotspots/spikes. For example, for a given user Bob, based on an evaluation of his historical information, it can be determined that there are spikes in application open events at two particular locations. It can then be inferred that the two locations are salient locations of interest. For example, it can be inferred that one of the locations is Bob's home, and the other is Bob's workplace. Other patterns can be determined from the geolocation-application open event information to determine other salient locations. The information can then be used to provide optimal targeted pushes to Bob based on his location, for example, when he leaves his home or work.

In some embodiments, feature extraction/indexing and counter incrementing are performed as information is received from device updates (e.g., in real-time), while session calculation (and/or repair), push influence estimation, and location inference can be scheduled. For example, the operations may not be required to be performed in real-time, additional contextual information (e.g., more events) may be required to perform the operations (e.g., processing should wait until further information is received), etc.

Figure 23:
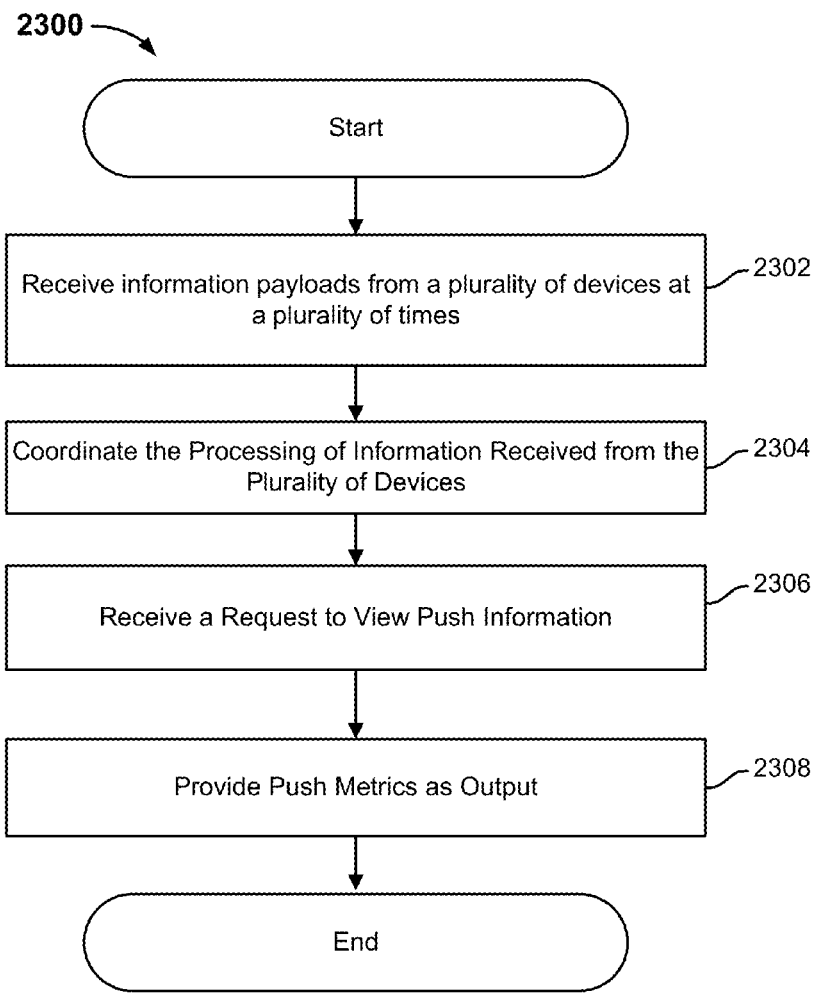
FIG. 23 is a flow diagram illustrating an embodiment of a process for push response reporting.

FIG. 23 is a flow diagram illustrating an embodiment of a process for push response reporting. In some embodiments, process 2300 of FIG. 23 is executed using application analytics processing and reporting engine 2100 of FIG. 21. The process begins at 2302 when payloads of information are received from devices. The payloads can be received from the devices over time and used to construct records of user behavior (e.g., of how they interact with an application installed on their mobile device). In some embodiments, a payload includes information associated with one or more events. In some embodiments, the events are sent by a mobile device and include application opens, closes, registrations, location information, etc. Examples of the meta information included in the payload includes information such as carrier (e.g., Verizon, AT&T, etc.), make/model of device (e.g., Apple iPhone 5, Samsung Galaxy S3, etc.), operating system (e.g., iOS, Android, BlackBerry, Windows Phone, etc.), application version, push notification library version, etc. In some embodiments, the received data included in the payload is normalized. As described above, examples of normalizing the data include correcting errors in the payload in the received data (e.g., incorrect date/time, etc.). Also as described above, received information can be used to construct a user timeline, which can be used to record when a user opened/closed an application.

In some embodiments, as described above, features of the payload (e.g., application opens/closes, meta information, etc.) are extracted. In some embodiments, counters for the features are incremented.

At 2304, the processing of data received from devices is coordinated. In some embodiments, as described above, processing of the data included in the received payloads includes extracting features from the received data, indexing the features, constructing timelines of user behavior, (e.g., application open events for users who have opted-in to having their behavior information collected), determining session times (and repairing session times), determining push influence, etc. As described above, the various processing can be coordinated such that some processing can be performed in real-time (e.g., feature extraction, counter incrementing, indexing, etc.) while some of the processing can be scheduled (e.g., calculation (and repair) of session time, determination push influence, etc.).

At 2306, a request is received to view push information. One example of push information is a push metric. The request can specify a selection of push metrics of interest, a range of time over which to view the metrics, an audience segment (e.g., to view push effectiveness by location, tag, etc.), etc. In some embodiments, an interface is provided to a user to receive an indication of a type of information and/or a report of interest. In some embodiments, the type of report is associated with a pre-configured template for viewing particular types of information.

Push metrics/information associated with the request can be calculated on-demand, in response to receiving the request for push information. The metrics are calculated continually as a background process (e.g., updated as payload information is received), with the metrics being looked up (e.g., by querying buckets including information of interest) when requested and based on criteria specified in the request.

At 2308, push metrics are provided as output. One example of an output provided at 2308 is a report. Examples of push information/metrics that can be reported include application open events by feature (e.g., operating system) over a time period, application events by audience segment (e.g., application open events by audience associated with a particular tag/location), a representation of the number of push notifications sent over time, along with values for activity (e.g., total number of application opens during the time, a number of push notifications sent during the period, etc.), a measure of the direct response (e.g., number/proportion/percentage of hard conversions), estimated soft conversions, estimated push influence, etc. Examples of reports are described in more detail below.

Figure 24:
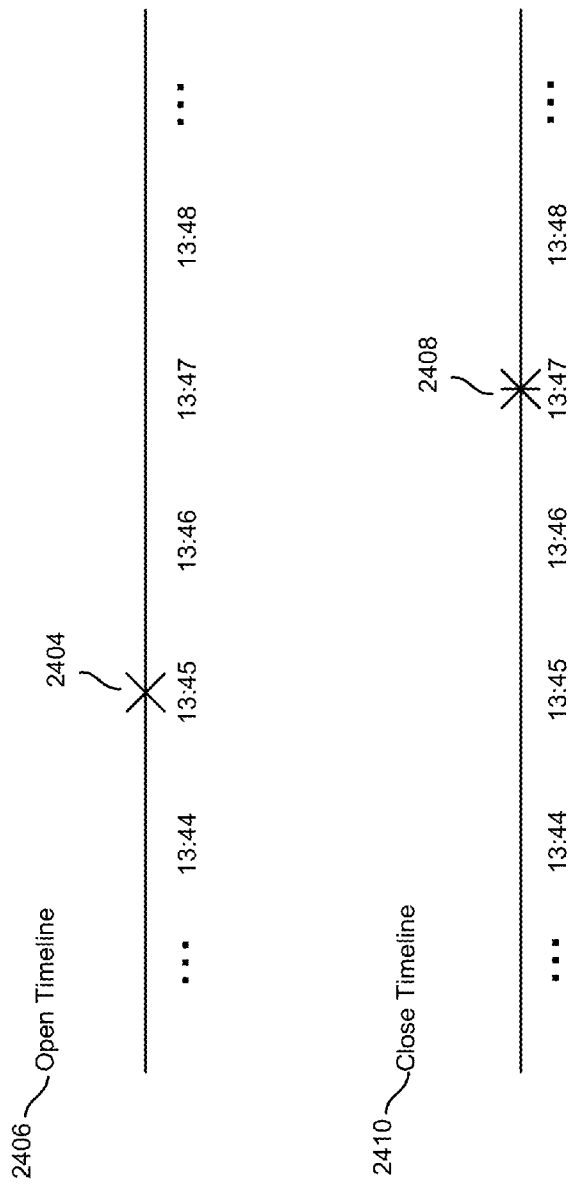
FIG. 24 is a diagram illustrating an embodiment of timelines associated with application open and close events for a user.

FIG. 24 is a diagram illustrating an embodiment of timelines associated with application open and close events for a user. In the example shown, as described above, application events can be inserted (e.g., using feature extraction/indexing engine 2202 of FIG. 22) into the timeline at various points corresponding to the observation timestamps of the events. In this example, given the open event and close event timestamps shown at 2402 (Nov. 21, 2013 13:45 and Nov. 21, 2013 13:47 respectively), the open event is inserted at 13:45 (2404) in open timeline 2406, and the close event is inserted at 13:47 (2408) in close timeline 2410.

Figure 25:
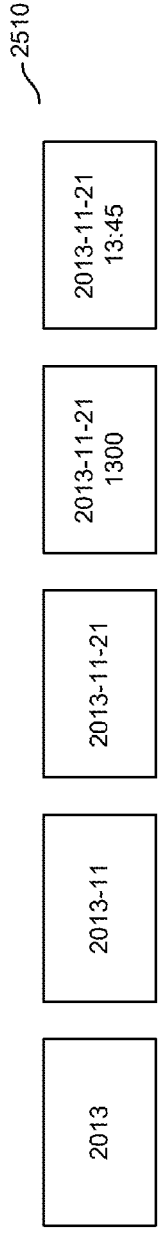
FIG. 25 is a diagram illustrating an embodiment of indexing features into buckets.

FIG. 25 is a diagram illustrating an embodiment of indexing features into buckets. In some embodiments, the features are indexed into their corresponding buckets using feature extraction/indexing engine 2202 of FIG. 22. In the example of FIG. 25, a device update including an open event observation timestamp (2502), device identifier (2504), operating system feature (2506), and carrier feature (2508) are shown. Given the timestamp shown, five time precision buckets are present at 2510. As described above, each feature (application open event, operating system, carrier, etc.) can be associated with its own respective sets of time buckets and inserted into their respective buckets. In some embodiments, each time precision is associated with a counter for a feature, which can be incremented each time a corresponding feature is received. For example, when the iOS operating system feature identifier is inserted into the 2013 Nov. 21 13:45 time bucket, a corresponding counter for the iOS operating feature can be incremented to reflect that an application was opened on an iOS device on 2013 Nov. 21 13:45. In some embodiments, the corresponding counters can be incremented using counter increment engine 2206 of FIG. 22.

Figure 26:
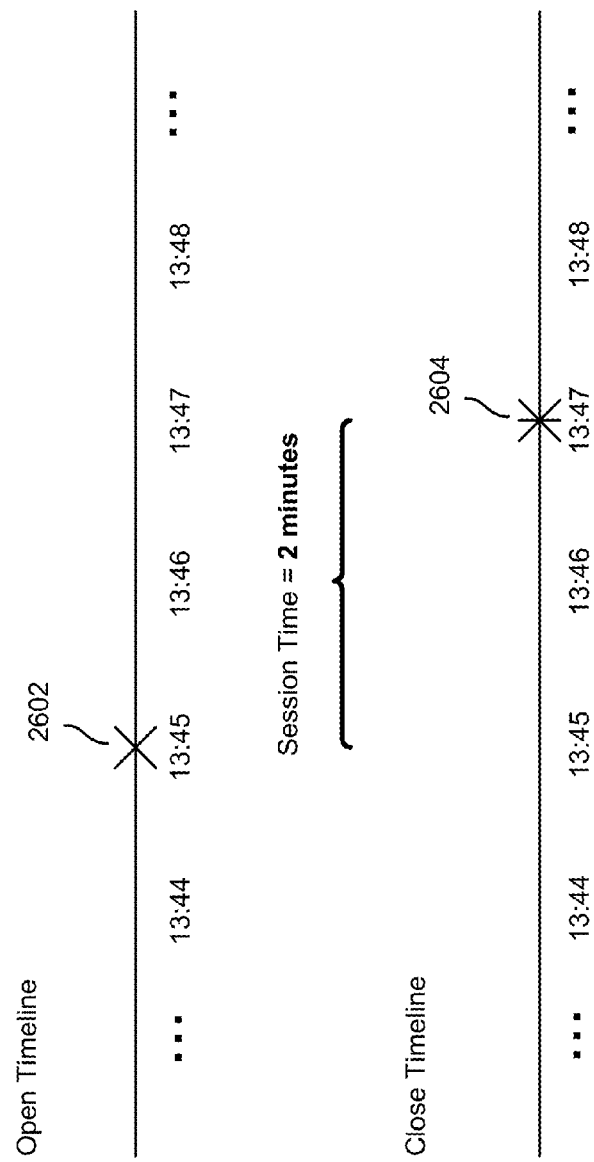
FIG. 26 is a diagram illustrating an embodiment of calculating a session.

FIG. 26 is a diagram illustrating an embodiment of calculating a session. In some embodiments, session calculation engine 2204 of FIG. 22 is used to calculate the session. In some embodiments, the timelines shown correspond to the timelines of FIG. 24. In the example shown, open and close events are retrieved from their respective timelines. Pairs of open and close events that follow one another (with the open event earlier than the close event) such as open event 2602 and close event 2604 are determined. For each pair, the session time-in-application is calculated by determining the difference between the time of the open event and the time of the close event. In this example, the calculated session time-in-application is two minutes.

Figure 27:
FIG. 27 is a diagram illustrating an embodiment of a report.

FIG. 27 is a diagram illustrating an embodiment of a report. In the example shown, the report is generated using analytics reporting engine 2112 of FIG. 21 and includes metrics determined using push influence calculation engine 2208 of FIG. 22 as well as collected historical information. In this example, a request for a report showing a histogram of application open events by iOS (operating system feature) over a period of time is shown. Other reports for other features can be requested. In some embodiments, data for the histogram is retrieved from corresponding feature time bucket indexes and/or counters (e.g., to retrieve number of iOS opens at each time granularity/precision/slice). In the example shown, the histogram is shown for the 24 hour time period between January 16 and January 17. Reports for other periods can be generated. In this example, the iOS open events are shown at the hour granularity. In this example, the circles at 2702 represent batches of push notifications that were sent. The position of each circle reflects the hour at which a batch of push notifications was sent, and the size of each circle is proportional to the number of push notifications that were sent in the batch. In the example, three batches of push notifications of decreasing size were sent over a span of three hours.

At 2704, metrics associated with the push activity in the time period are shown. During this period, 1,832,520 iOS devices opened the application that is being reported on. During this period, a marketer, such as Alice, sent 2,078,609 push notifications. At 2706, it is shown that of the total application open events, five were found to be direct opens in response to the sent push notifications (e.g., hard conversions). At 2708, it is shown that of the total application open events, 530,339 of the application open events were determined/estimated/inferred to have been influenced by the sent push notifications (e.g., soft conversions and hard conversions).

Figure 28:
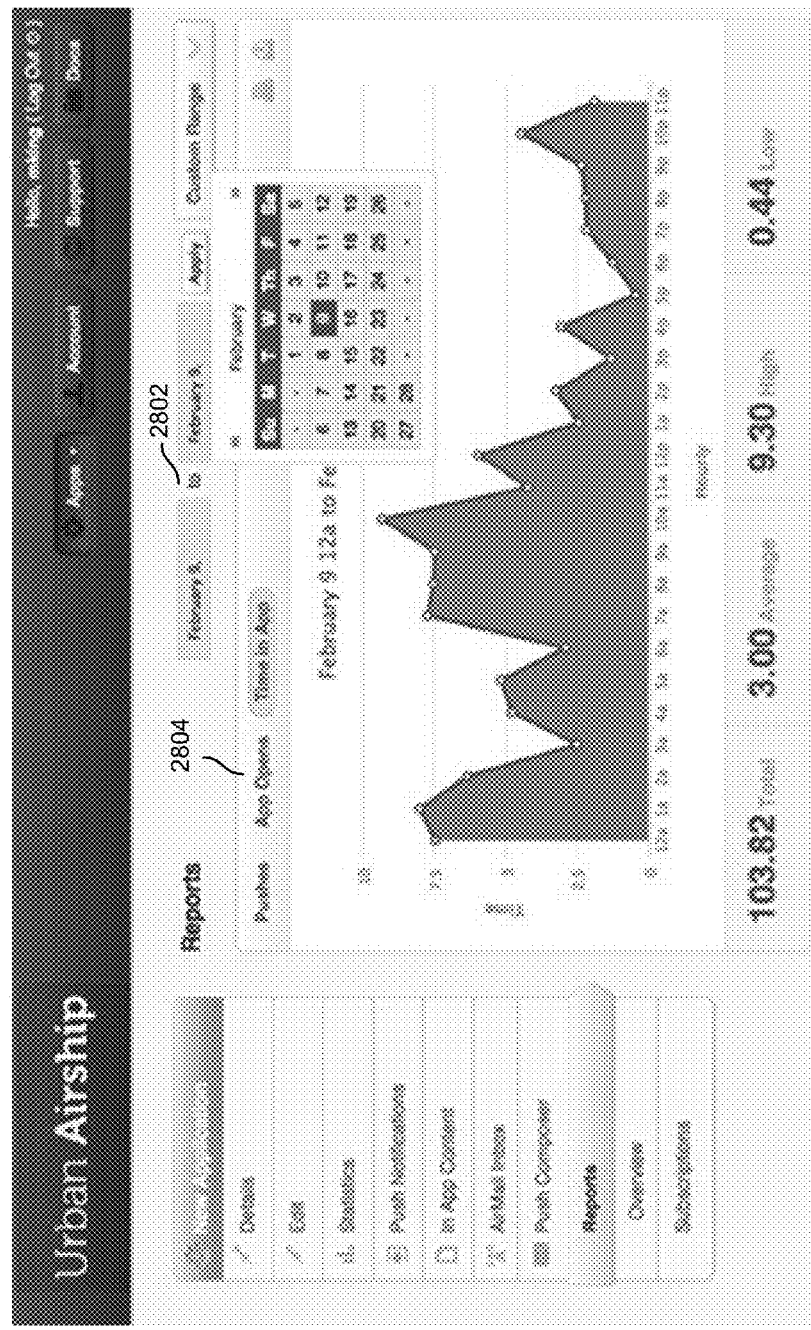
FIG. 28 is a diagram illustrating an embodiment of a session time-in application report.

FIG. 28 is a diagram illustrating an embodiment of a session time-in-application report. In some embodiments, the report shown is generated by analytics reporting engine 2112 of FIG. 21 using information determined using session calculation engine 2204 of FIG. 22. In this example, time-in application (session time) is shown hourly in a histogram over the course of a day. At 2802, the period of interest is specified. Custom time ranges can be specified. In the example shown, over the course of the day, spikes in data are shown to occur at approximately 1 am and 10 am. A marketer, such as Alice, can use the information in the report to determine the optimal time to send push notifications. Other views (e.g., pushes, app opens, etc.) can also be displayed at 2804 via the interface.

Figure 29:
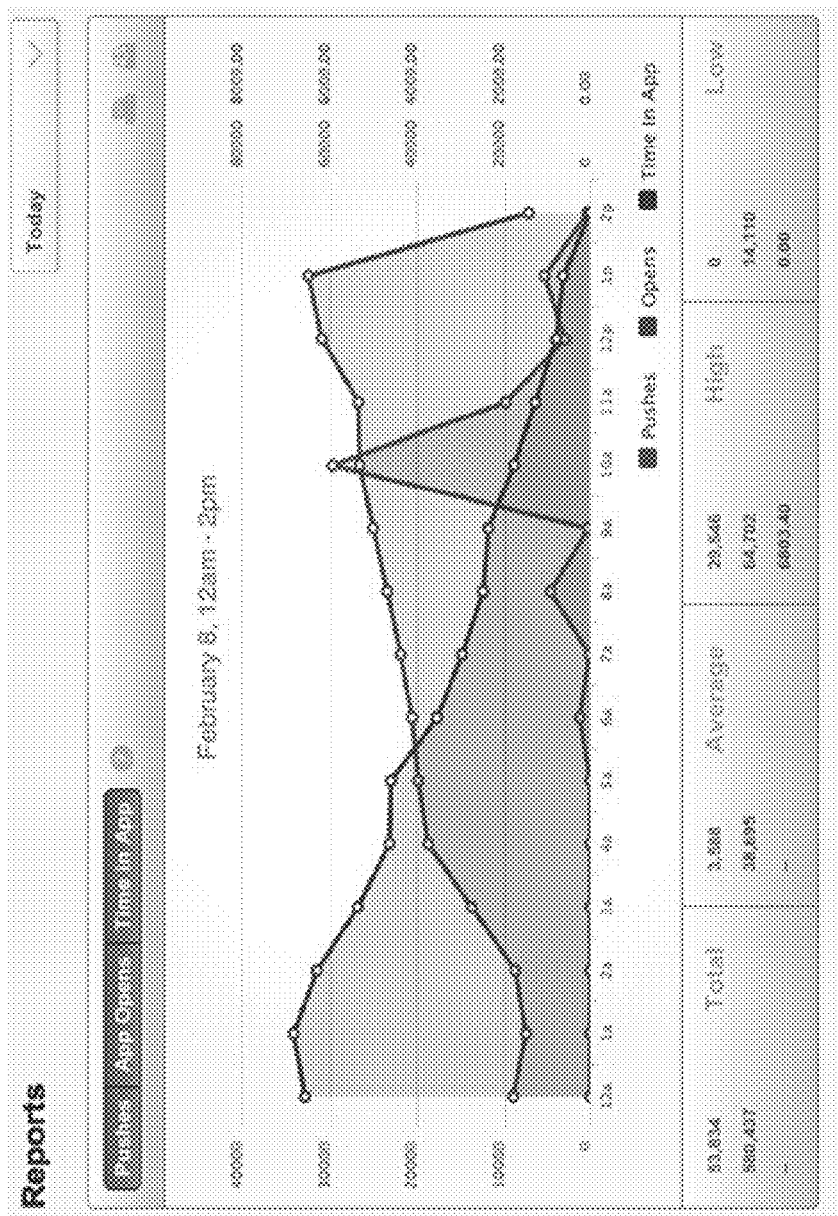
FIG. 29 is a diagram illustrating an embodiment of a report.

FIG. 29 is a diagram illustrating an embodiment of a report. In this example, graphs of pushes, application opens, and the amount of time users spent within the application is shown overlaid on top of each other to demonstrate their interrelation.

Soft Conversion Model and Estimation

As explained above, soft conversions are application opens that happened soon after a push, but where the user may or may not have clicked on the push notification itself. In some embodiments specific users who clicked are not filtered out from the soft conversions, or are hard conversions subtracted out. In other embodiments, soft conversions are application opens that were caused by the push notification but were not directly from the notification itself.

Figure 30:
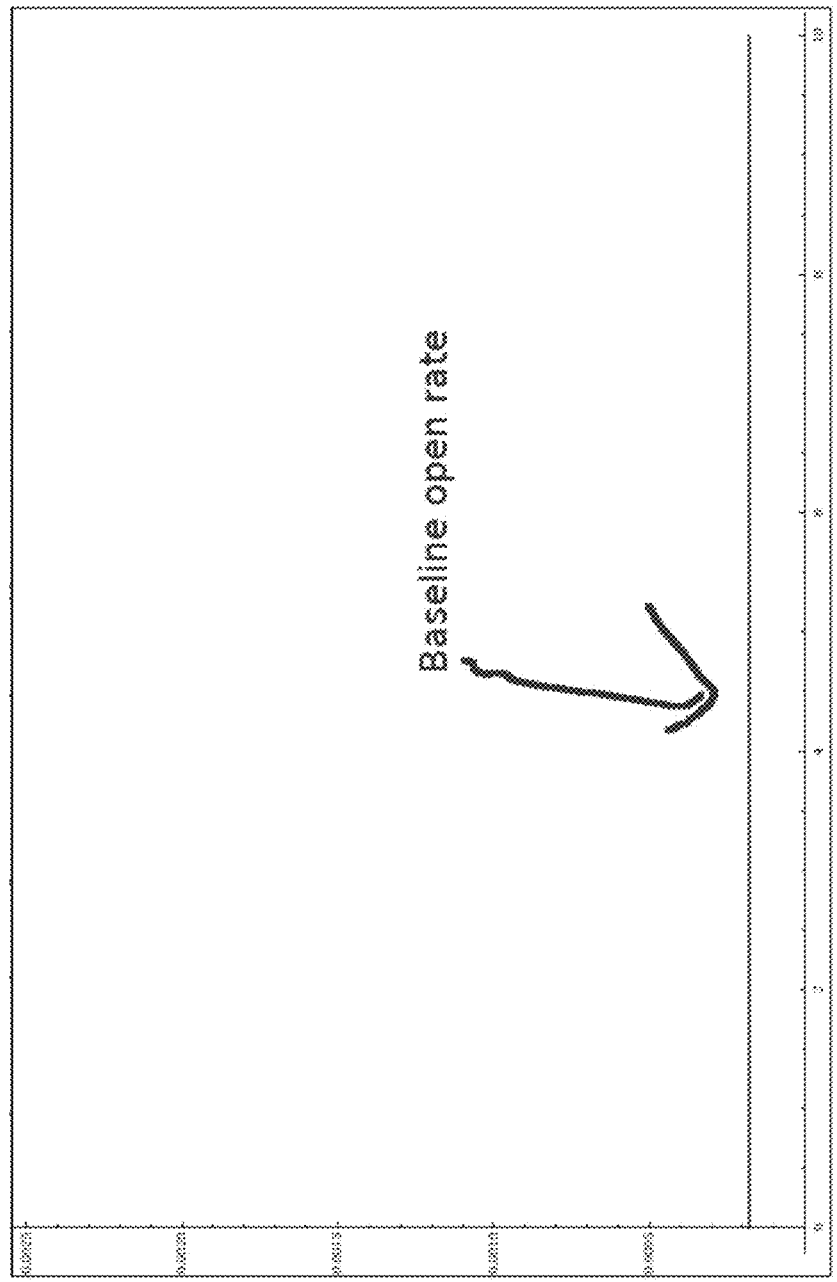
FIG. 30 is a diagram illustrating an embodiment of a baseline open rate.

The rate at which users open an application (either due to hard conversions or soft conversions) can be calculated in a variety of ways, including by using a model. As one example, a model can be used to break the rate down into two pieces: (1) a baseline and (2) a push effect. The baseline represents the probability that a user will open the app for reasons other than the push notification. The baseline open rate can be expressed per hour (e.g., what is the probability of a user opening an application in a given hour). An example of a baseline open rate is shown in FIG. 30.

Figure 31:
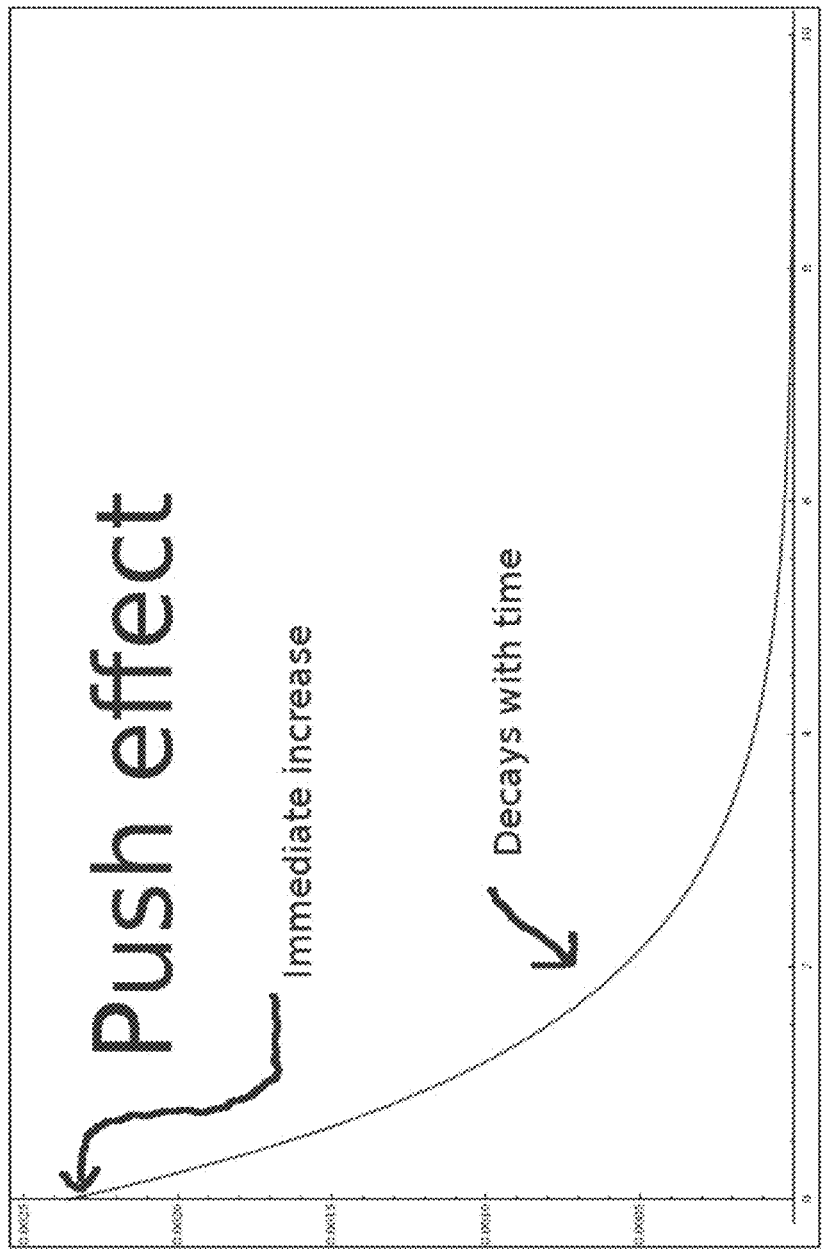
FIG. 31 is a diagram illustrating an embodiment of a push effect.
Figure 32:
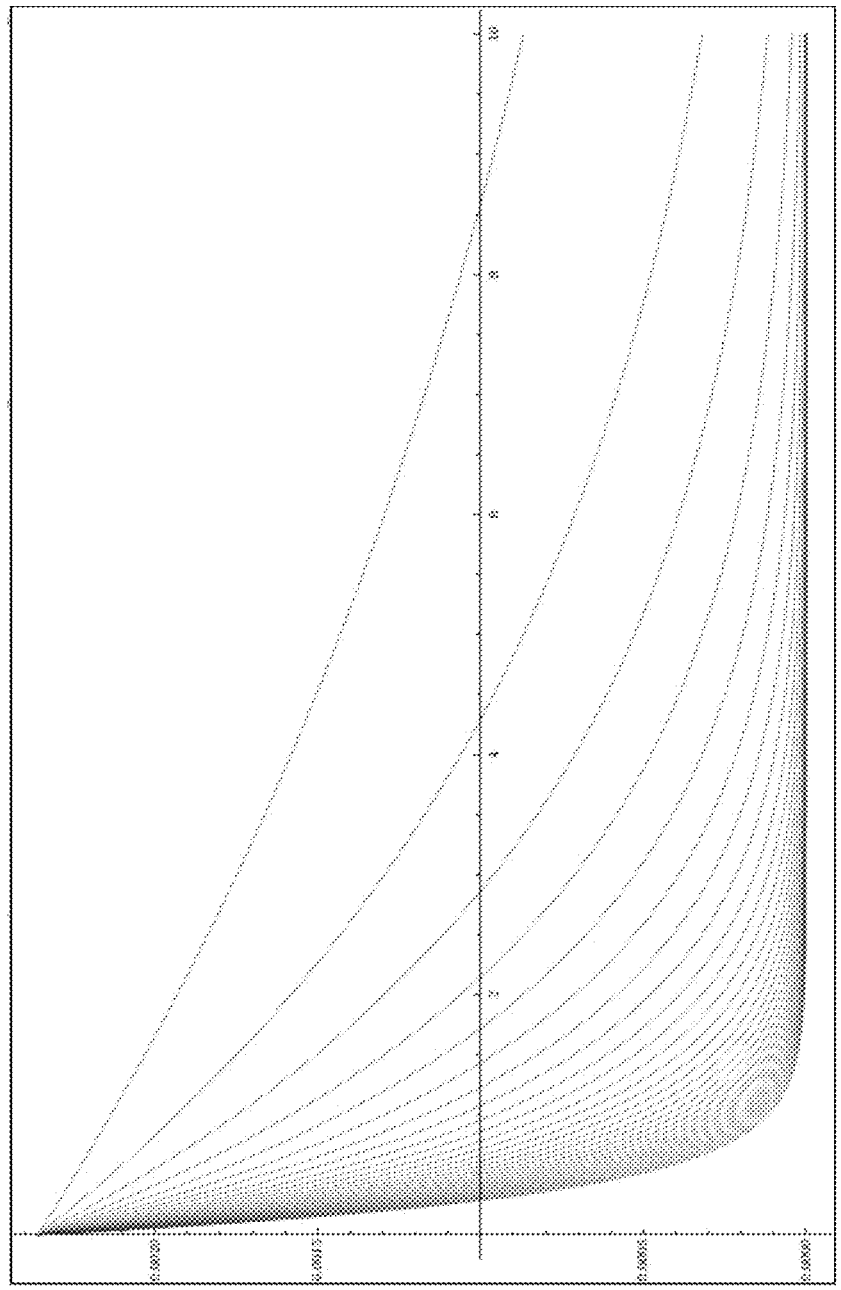
FIG. 32 is a diagram illustrating an embodiment of decay rates.

The push effect is the probability that a user, who is a certain/given/particular number of hours removed from receiving their last push, will open the application because of the push notification. The push effect is made up of two parameters, the post push probability and the decay rate. The post push probability is the probability that a user will open the application because of a push having been received within an hour. FIG. 31 shows an example of the push effect. FIG. 32 shows an example of decay rates.

Figure 33:
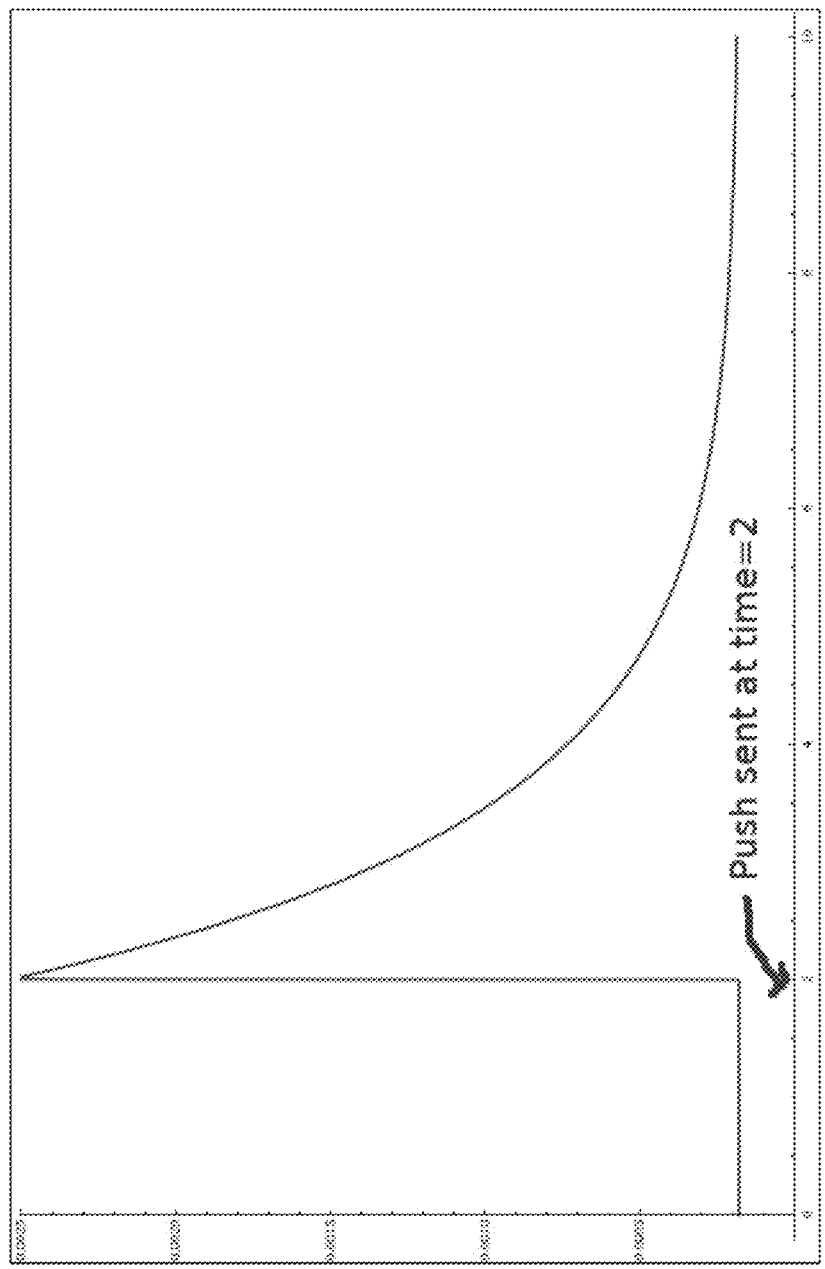
FIG. 33 is a diagram illustrating an embodiment of a probability timeline for a user.

The two parameters of the model, the baseline and the push effect (which is in turn made up of two parameters, post push probability and decay rate), can be combined to estimate the probability that a user, who is $d_t$ number of hours removed from receiving their most recent push will open an application. FIG. 33 shows an example of a probability timeline for a user.

Given the soft conversion model, for a given application and historical data about open app events and when push notifications were sent, values of the three parameters (baseline, post push probability, and decay rate) are determined which best explain the historical data. Then, given these parameters, the number of soft conversions can be estimated as follows. For a given group of N opens by users who are a distance in hours $d_t$ removed from their most recent push, the following value is calculated:

$$N * \frac{\text{push effect at } d_t}{(\text{push effect at } d_t) + \text{baseline}}$$

The calculated value represents the number of application opens that are soft conversions. As an example, suppose that given our parameter values, it is estimated that of the application open events that occur within one hour of receiving a push notification ($d_t$=1 hour), ⅘ are due to soft conversions (with the other ⅕ being attributed to other reasons for opening an app). Thus, if there are 25 users that opened the app within one hour of receiving a push notification ($d_t$=1 hour), it is estimated that ⅘$^{th}$, or 20 of the application opens are soft conversions.

FIG. 30 is a diagram illustrating an embodiment of a baseline open rate. In this example, the baseline rate is 0.00018. Described another way, the baseline open rate is the probability of a user opening the application in a given hour. Or, described in another way, out of 100,000 users, on average approximately 18 users will open the app in a given hour.

FIG. 31 is a diagram illustrating an embodiment of a push effect. In the example shown, the post push probability is 0.0023, which for example represents that out of 100,000 users 230 will open the application immediately after receiving a push notification. In some embodiments, the decay rate determines the rate at which the push effect diminishes over time.

FIG. 32 is a diagram illustrating an embodiment of decay rates. In the example shown, example plots with varying decay rates are shown.

FIG. 33 is a diagram illustrating an embodiment of a probability timeline for a user. In this example, the probability timeline for a user who has received a push notification is shown starting from two hours prior to receiving the push until eight hours after receiving the push.

Composing a Push Notification

Suppose that Alice would like to draft a push notification to devices on several platforms (e.g., iOS, Android, Blackberry, Windows phone, etc.). Each platform can have its own real-time messaging protocol and each of the operating systems associated with the platforms can also have a unique presentation flow and user experience. Using the tools described herein, a message creation interface for the disparate platforms can be provided that allows Alice to preview the messaging experience on each operating system. In some embodiments, the preview can be rendered in real-time, for example, as Alice is drafting a push notification (e.g., entering text of a message included in push notification). In this way, Alice can preview exactly how users will view and engage with her message/content across different devices.

Figure 34:
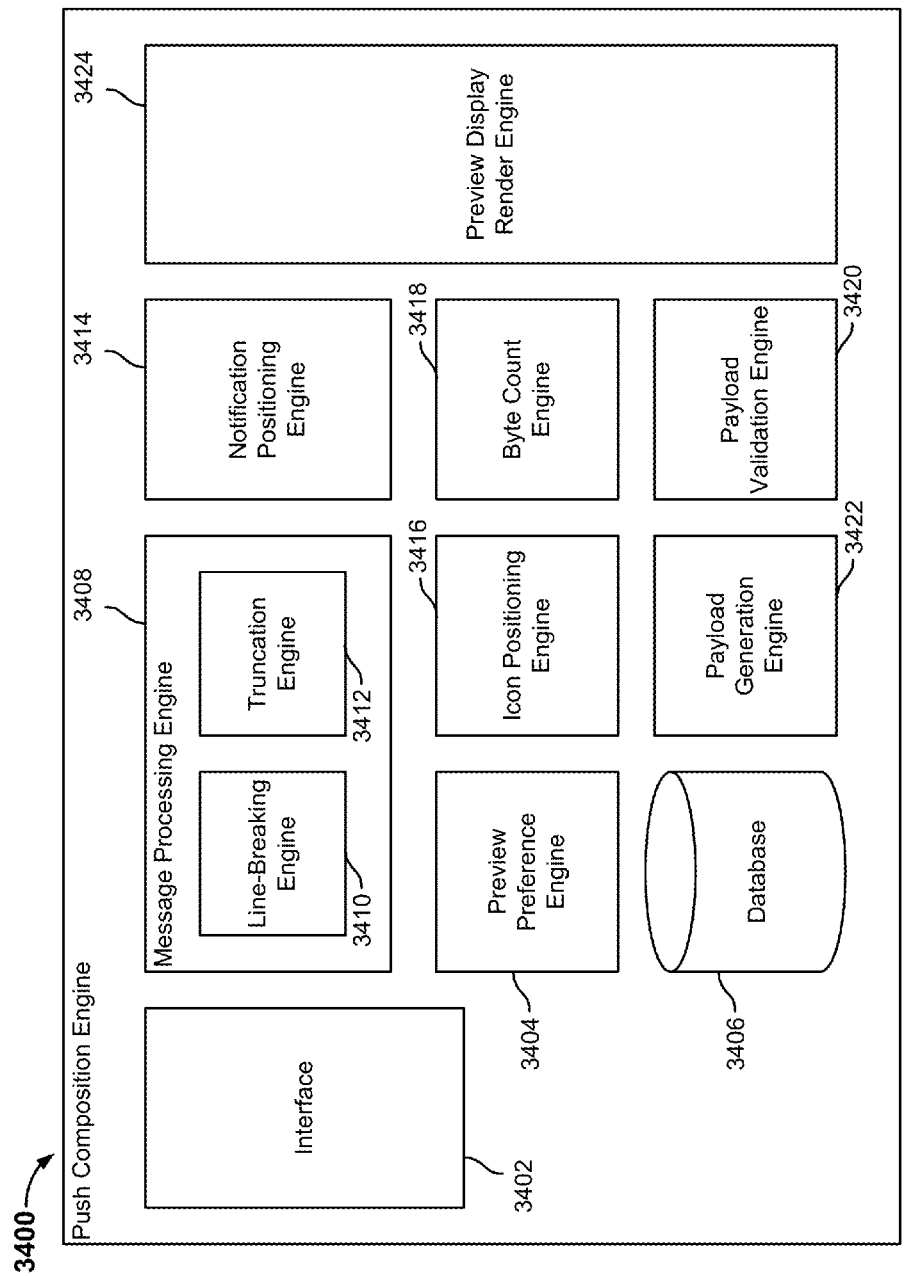
FIG. 34 is a block diagram illustrating an embodiment of a push composition engine.

FIG. 34 is a block diagram illustrating an embodiment of a push composition engine. In some embodiments, push composition engine 3400 of FIG. 34 is push composition engine 216 of FIG. 2. In the example shown, push composition engine 3400 includes interface 3402, preview preference engine 3404, database 3406, message processing engine 3408 (which includes line-breaking engine 3410 and truncation 3412), notification positioning engine 3414, icon positioning engine 3416, byte count engine 3418, payload validation engine 3420, payload generation engine 3422, and preview display render engine 3424.

Interface 3402 is configured to receive user input for composing a push notification. The user input can include instructions for specifying the push notification. The received instructions can be specified using text input fields, radio button selections, drop down menu selections, paging, scrolling, etc. An example of an interface is described below in conjunction with the example interface of FIG. 36.

The instructions received via the interface can include instructions for specifying values for content items included in a push notification. Examples of content items included in a push notification include a message (e.g., text of the message), sounds, badges, etc.

Each of the content values specified above is a value for an attribute/type of content included in the push notification. Specified message text such as "Free puppies at the pound," is an example of a message attribute of a push notification. When including content items in a payload of a push notification (e.g., using payload generation engine 3422), each of the content items is associated with a key, which can be an identifier (e.g., string identifier) used by an operating system or application for processing the specified content value paired with the key. For example, in iOS, the message text that a user such as Alice specifies is associated with the key "alert." When iOS processes a payload of a push notification and recognizes the key string "alert," it determines that the value (e.g., text characters) paired with the "alert" key string should be processed as the message text of the push notification. The names of keys for similar content items can be different across platforms. For example, the key name for the message text can be different for Android as compared to iOS.

Each operating system type/version can be associated with its own set of keys corresponding to content attributes included in a payload of a push notification sent to devices running the operating system (e.g., a push notification for one platform can include a key-value pair that does have an analogue in another platform). Instructions for custom key-value pairs can also be received via the interface. For example, applications can also be associated with custom key-value pairs specific to the given application. As one example, for a particular sports application, a key-value pair for handling special animations unique to the sports application can be specified.

The instructions received via the interface can also include delivery instructions, such as the audience for the push notification. The audience instructions can be for the platforms of interest (e.g., operating systems such as iOS, Android, Blackberry, Windows Phone, Windows 8, or any other appropriate operating system/platform), devices of interest (iPhone models, Android devices, etc.), the recipients of the push notification (e.g., broadcast, devices by tag, a single device, devices by segment, etc. which can be determined using query engine 702 of FIG. 7), etc. The delivery instructions can also include delivery time instructions (e.g., now, later, custom date/time range, etc.).

The instructions received via the interface can also include instructions for creating rich push notifications including rich media (e.g., HTML, video, audio, maps, surveys, and any other appropriate rich media/content). This can allow push messages to be kept in a persistent inbox location within an application on a target device. Rich push messages including rich media can also be previewed.

The instructions received via the interface can also include instructions for specifying a selection of a preview preference. In some embodiments, preview preferences are a preference for a preview screen of interest. The preview is a representation of a type of screen on a device. For example, the available types of preview screens (on which a push notification will be displayed) can be different for each platform. Additionally, within each platform, there can be different types of landing screens for a push notification (e.g., lock screen, unlock screen, notification center screen, etc. for an iOS operating system). As the push notification will ultimately appear and be presented differently based on the landing screen on which it is viewed, the selected preview preference can dictate the rules by which a preview of the push notification is formatted and rendered. Examples of different preview landing screens are shown below.

The preference for a type of preview landing screen can be specified by scrolling through candidate preview landing screens and arriving at one of interest. The candidate landing screens to be selected from are based on a user's specification of their operating systems of interest. For example, if Alice specifies only iOS and Android operating systems as of interest, preview landing screens for other platforms, such as Blackberry and Windows phones are not made available. Alice can then select the preview preference landing screen(s) of interest to her (e.g., lock screen for iOS) to preview how her push notification would be rendered on her selected preview landing screen.

Preview preference selection engine 3404 is configured to process a selection/request for a preview preference landing screen (e.g., received via interface 3402). The preview preference engine is configured to retrieve (e.g., from a database such as database 3406), based on the selection of the preview preference landing screen of interest, an identifier for the preview preference landing screen, a stock image for that landing screen to be used for rendering, etc. The identifier for the selected preview landing screen can then be used to determine the rules that are applied when processing Alice's push notification to define how the notification will appear on the selected preview screen.

Message processing engine 3408 is configured to process a message (e.g., text specified by user in interface 3402). In the example shown, the message processing engine includes line-breaking engine 3410 and truncation engine 3412.

The line-breaking engine is configured to break up the text of a specified message into lines according to rules associated with the selected preview screen that the text is to be rendered in. The preview screen identifier described above is used to determine the line-breaking rules that are applied to break up the text of a message. Message text inputted by a user is broken up into several lines due to width constraints of the push notification. For example, if the message text is too long to fit on one line of a rendered push notification, the message text is broken up into lines to mirror how an operating system of a device would break up the text into multiple lines. In some embodiments, the line-breaking is implemented using HTML, CSS, etc.

The width of a text area, the number of lines that the text is broken up into and where the lines-breaks are inserted can be different for different platforms. For example, for one operating system, the line-breaks can occur after every 40 characters, while in another operating system, the line-breaks can occur after every 50 characters. For example, suppose that Alice inputs text for a message, "There are going to be free puppies at the downtown pound on Tuesday 12/23. Merry Christmas and Happy New Year!" In one preview for a platform, the message might be broken down as follows:

"There are going to be free puppies at
the downtown pound on Tuesday 12/23.
Merry Christmas and Happy New Year!"
while for a different operating system, the message might appear as:

"There are going to be
free puppies at the
downtown pound on Tuesday
12/23. Merry Christmas
and Happy New Year!"

Within an operating system, the line-break rules can be different for different selected types of preview landing screens (e.g., lock screen vs. unlock screen). Additionally, if the line-break is determined to occur in the middle of a word, a "-" can be inserted to split the word across the end and beginning of two lines, or the word can be moved to the next line. Carriage returns specified by the user in the text of the message can also be accounted for as an explicit line-break point. Line-break rules can also be specified to perform reverse line-breaks, in which a specified message including multiple lines and carriage breaks can be formatted into a single line, reflecting how it would appear on a particular type of preview screen. Examples of different line-breaks are shown below.

The truncation engine is configured to truncate the text of a specified message according to the selected preview landing screen that the text is to be rendered. The preview screen identifier described above can be used to determine the truncation rules that are applied. One example of a rule is one that specifies that if the text of a message is too long and exceeds the bounds of a push notification, the text is truncated. Ellipses can also be added after the point of truncation in the text to indicate that there is more text to the message. In various embodiments, the truncation point is determined based on a hard character limit, a hard line character limit, or any other appropriate limit. Different devices, operating systems, and landing screens can have different limits. The truncation point can also be based on the number of lines that the message takes up. For example, the message can be truncated if the message exceeds four lines (which can be determined using the line-breaking engine). While the truncation point can be determined to occur in the middle of the word, the truncation point can also be determined such that it does not occur in the middle of the word, but at the end of a whole word (e.g., text unit delineated by spaces). Based on the truncation point, ellipses can be added to the cutoff/truncation point to indicate that there is more text to the message. For example, if the message, "There are going to be free puppies at the downtown pound on Tuesday. Merry Christmas and Happy New Year!" exceeds the limits of the push notification bounds, the message can be truncated as follows:

"There are going to be free puppies at
the downtown pound on Tuesday 12/23.
Merry Christmas and Happy . . . "

Now that Alice has seen where the message truncates at, she can adjust her message so that it will appear as she desires (e.g., to not cutoff after "Happy").

Notification positioning engine 3414 is configured to determine the position of a push notification on a preview screen. In various embodiments, push notification positioning is implemented using HTML, CSS, or any other appropriate language. The position of the push notification is determined based on the preview screen of interest (e.g., using the identifiers for selected types of previews described above). For example, given the preview landing screen (e.g., lock screen, unlock screen notification, notification center screen, etc. for iOS, Android, etc.), the top left coordinate, center coordinate, or any other appropriate reference coordinate position for the notification can be selected for positioning the push notification. The notification can then be rendered according to the selected position.

Icon positioning engine 3416 is configured to determine the scale and position of an icon (e.g., stock icon for an application) in a push notification (or relative to the push notification). Given a selected preview landing screen, the position of the icon can be determined based on the height of the notification. In some embodiments, the scale of the icon is proportional to the size of the notification. The scaled and positioned icon can then be super-imposed on a portion of the notification when rendered.

Byte count engine 3418 is configured to determine a byte count for a push notification. The push notification content that a user specifies (e.g., message text, badges, sounds, custom key-value pairs, instructions received via interface 3402, etc.) are inserted into a payload of a push notification that can be sent to a device.

The push notifications can have maximum payload sizes, depending on platform. For example, a given push notification system can specify a fixed payload limit of 256 bytes. Different platforms can be associated with different maximums for payload sizes. The sizes (e.g., byte counts) of each of the specified push notification components/content (e.g., message text, badges, sounds, custom key-value pairs, etc.) are calculated, and their total byte count value compared to the maximum payload size. A remaining byte count (which can also be negative if maximum byte count has been exceeded) can then be determined and displayed to a user such as Alice so that she can view the number of bytes she has remaining as she drafts her push notification.

When counting the number of bytes in the text of a message being specified, the characters can be translated into bytes. For example, the byte lengths of each of the characters in a message text can be determined. Different characters can have different byte lengths. For example, the byte length of a wide character such as the smiley-face symbol can exceed that of a typical character.

The byte count calculation is different between platforms. For example, certain key-value pairs may only be applicable to one operating system, but not another. For example, if a user specifies a key-value pair that would be included in an Android payload, but not for an iOS payload, the byte size of the custom key-value pair does not contribute towards the total byte count of the iOS payload. For example, Android can include a key-value pair for "time-to-live" that is specific to Android. However the "time-to-live" byte size should not affect the byte count for iOS. Thus, if an author wishes to send push notifications to different platforms, when determining the byte count for a given operating system (associated with a particular platform), the key-value pairs that are not applicable to the given operating system are filtered out and do not contribute to the byte count. For example, an author of a push notification that will go to both the iOS and Android platforms can specify ten key-value pairs, only five of which are applicable to iOS, while 8 are applicable for Android (e.g., overlapping applicability). The byte counts for the push notifications that would be sent for each operating system are then calculated accordingly. Determining the total byte count for a push notification for a particular platform can also include determining a list of the specified key-value pairs (content items) applicable to the push notification for the particular platform, and summing their respective byte counts.

Payload validation engine 3420 is configured to validate a push notification payload. Validating the payload of a push notification includes determining whether a potential payload of a push notification is valid based on the inputs specified by a user. If the payload is determined to be invalid (and a push notification with the payload cannot be sent), an error message can be displayed indicating the invalid status of the push notification as well as an explanation of the error and why the push notification is invalid.

A push notification can be determined to be invalid if the byte count of the payload (including the message text, badges, sounds, custom key-value pairs, etc.) exceeds the maximum limit for the payload for a given platform. An error message indicating that the maximum byte count limit of the push notification has been exceeded can then be displayed to a user. Payload validation can be performed by validating a generated shadow payload (e.g., meta-payload generated using payload generation engine 3422 of FIG. 34) of a push notification as currently specified (e.g., according to key-value pairs and other parameters based on instructions specified by a user). A push notification can also be determined to be invalid if no alert text (e.g., message) is specified. As another example, a push notification can be determined to be invalid if an incorrect scheduled time has been specified (e.g., author has scheduled for the push notification to be sent at a time in the past). A message indicating that an incorrect time has been specified can be displayed to the user. The push notification can also be determined to be invalid if an audience for the push notification has not been specified (e.g., no audience segment selected, no tags selected, etc.) or has been specified incorrectly (e.g., tag selection results in no recipients).

Validation of the push notification and its contents can be determined across platforms of interest. For example, if Alice specifies mobile platforms iOS and Android as of interest, then validation of the push notification is performed with respect to the different mobile platforms, which can have different validation rules. For example, as described above, while the byte count of a push notification may be within the acceptable bounds for iOS, specified key-value pairs can cause an Android push notification to exceed the bounds for the Android mobile platform. Thus, an error message would be produced when viewing an Android preview, but not when viewing an iOS preview.

Preview display render engine 3424 is configured to render and display a preview of a push notification based on the selected types of preview landing screens (e.g., using retrieved stock screen images), the received user inputs/instructions (e.g., message text, badges, sounds, custom key-value pairs, etc.), the formatting performed according to the received user inputs (e.g., push notification message formatting), etc. In order to view the different devices that the push notification can appear on, a user can page between different types of previews that are rendered for display. For example, the user can scroll through various types of preview screen representations (e.g., lock screen for iOS device, unlock screen for iOS device, lock screen for Android device, notification center for Android device, etc.), where each preview has the push notification rendered appropriately given the type of preview being viewed. Multiple types of previews can also be rendered concurrently (e.g., view Android lock screen preview side-by-side with iOS lock screen preview to compare the two).

Figure 35:
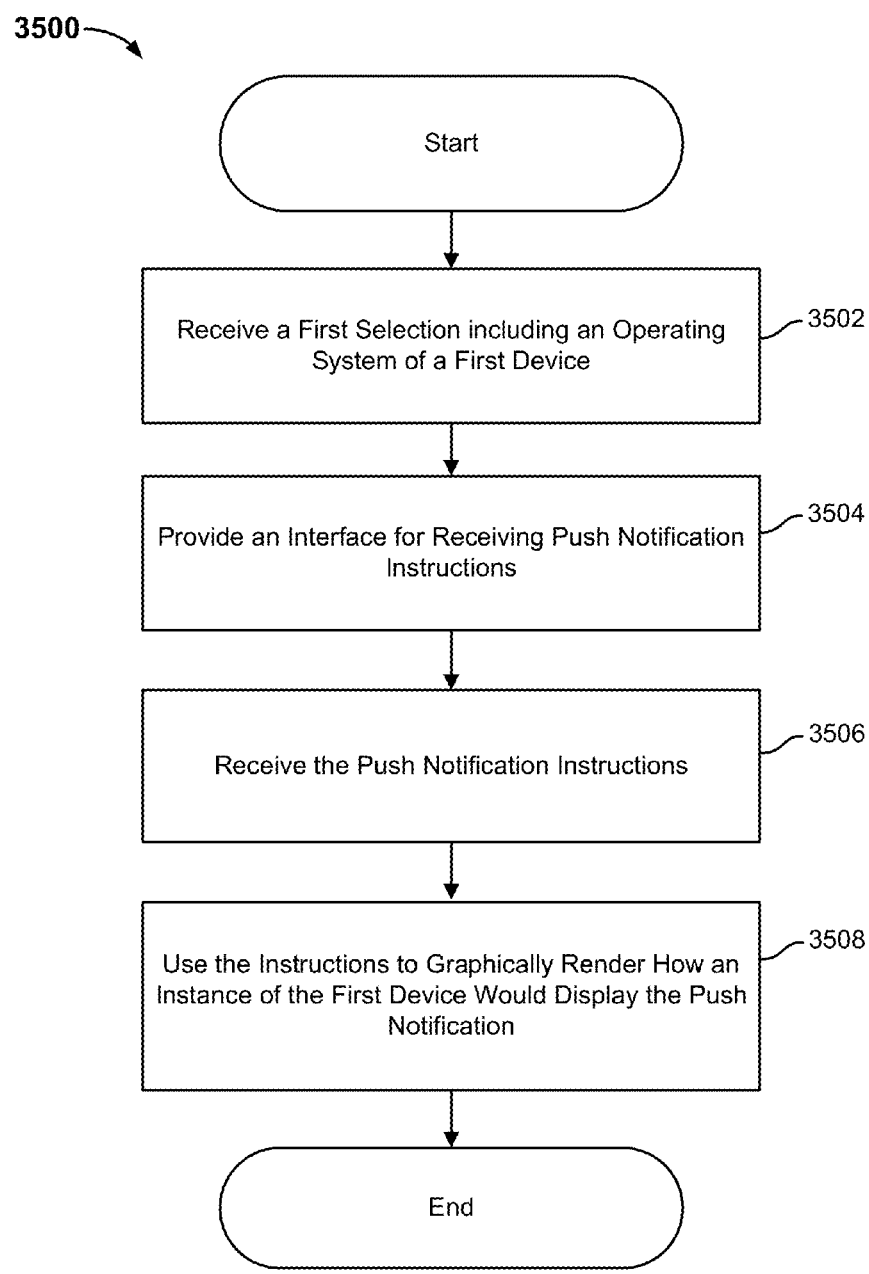
FIG. 35 is a flow diagram illustrating an embodiment of a process for previewing a push notification.

FIG. 35 is a flow diagram illustrating an embodiment of a process for previewing a push notification. In some embodiments, 3500 is executed by push composition engine 3400 of FIG. 34. The process begins at 3502 when a first selection including an operating system of a first device is received. In some embodiments, the selection includes an identification of the type of the first device (e.g., iPad vs. iPhone vs. Nexus 4, etc.). In some embodiments, the selection is received as a choice made from a plurality of devices. For example, a user can be presented with multiple devices (e.g., iPhone 4, iPhone 5, Galaxy Nexus, Nokia 920, etc.) to select from.

A second device can also be selected for previewing (e.g., iPhone and Android phone can be previewed). The user can then switch between the different previews to see how their push notification would appear on different devices. Different devices associated with the same platform can also be previewed (e.g., iPhone vs. iPad).

At 3504, an interface for receiving push notification instructions is provided. For example, the user can be presented a web interface with fields, drop down menus, checkboxes, radio buttons, etc. that the user can provide input to define instructions for a push notification. As described above, the instructions include user input for defining content included in a push notification, such as specified alert text (e.g., message text of push notification), badges, sounds, custom key-value pairs, etc. The instructions can also include delivery instructions for defining an audience, such as platforms/operating systems/devices of interest, recipients (e.g., broadcast, tag, audience segment), delivery time, etc. Instructions for creating rich push notifications including rich media (e.g., HTML, video, audio, maps, and other rich media) can also be received via the provided interface. Instructions specifying a preview preference can also be received via the provided interface.

At 3506, the push notification instructions are received. As described above, it can be determined whether the payload specified by the received instructions is valid (e.g., byte count limit exceeded, no alert text set, invalid recipient list, scheduled delivery time is in the past, etc.).

At 3508, the received instructions are used to graphically render how an instance of the first device would display the push notification if it were to be received by the instance. The preview of the device with the push notification of an appropriate size and location within the preview screen can be displayed to a user, along with an appropriately formatted message. Any other appropriate specified content items (e.g., content represented by custom key-value pairs for an application) can also be rendered. The push notification can also include an appropriately scaled and positioned icon.

Figure 36:
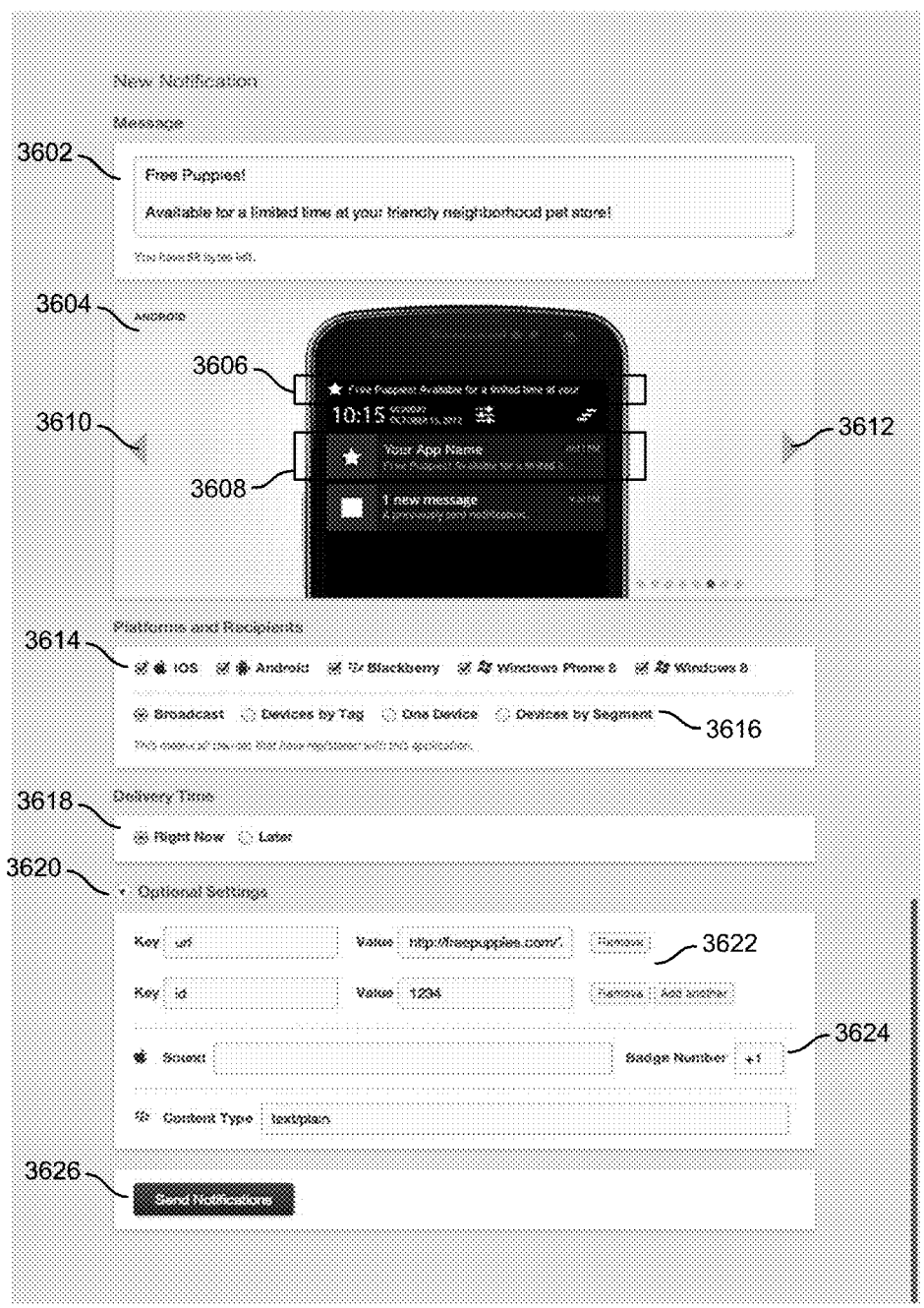
FIG. 36 is a diagram illustrating an embodiment of an interface for composing and previewing a push notification.

FIG. 36 is a diagram illustrating an embodiment of an interface for composing and previewing a push notification. In the example shown, at 3602, a message for the push notification is specified. At 3604, a preview of the push notification as it appears on a particular type of screen on a device is shown. In this example, a preview of the message appearing in the notification center landing screen of an Android device is shown. For the notification screen, the message is configured to be rendered in two areas/positions (3606 and 3608) of the preview notification screen. As shown with respect to the first area 3606, although the message at 3602 was specified with a carriage return between two lines, the message has been formatted for the notification center screen so that it appears as a single line (e.g., reverse line-break). Additionally, as shown, the message has been truncated after "your." The icon for the application is also shown positioned next to the single line message.

At 3608, the message is displayed once again in a second area of the device screen. As with the first instance, based on the line-break rules for the particular type of preview being rendered, the second instance of the message has been collapsed into a single line. Additionally, based on the truncation rules for the preview, the second message on the screen has been truncated at a different point (in the middle of a word), with ellipses added.

In the example shown, an author of the push can scroll/page between different previews (e.g., by using arrows 3610 and 3612). In some embodiments, the different previews available to be scrolled through are provided based on user input specifying platforms of interest (3614). Previews for the different platforms (and the different landing screens for each platform) can be prepared/generated for display. In this example, as all platforms have been selected, previews for all of the platforms and their respective potential landing screens will be generated.

At 3616, recipients for the push notification are specified. At 3618, a delivery time is selected. At 3620, optional settings, such as custom key-value pairs, sounds, badge number, and content type are specified. For example, at 3622 two custom key-value pairs have been specified, one associated with a "url" key, the second associated with an "id" key. In some embodiments, the application on an instance of the previewed device is configured to process the key-value pairs included in the payload of the notification sent to the device. Additional custom key-value pairs can be added. In the example shown, at 3624, a badge number is shown. In some embodiments, a badge is an indicator/counter of pending events associated with an application (e.g., number of new emails in mail app). The badge can be specified as a relative value (e.g., +1 to the current badge value on the application) or as an explicit value (e.g., to set the badge number to the explicit value). At 3626, an option is presented to send push notifications according to the user specification.

Figure 37:
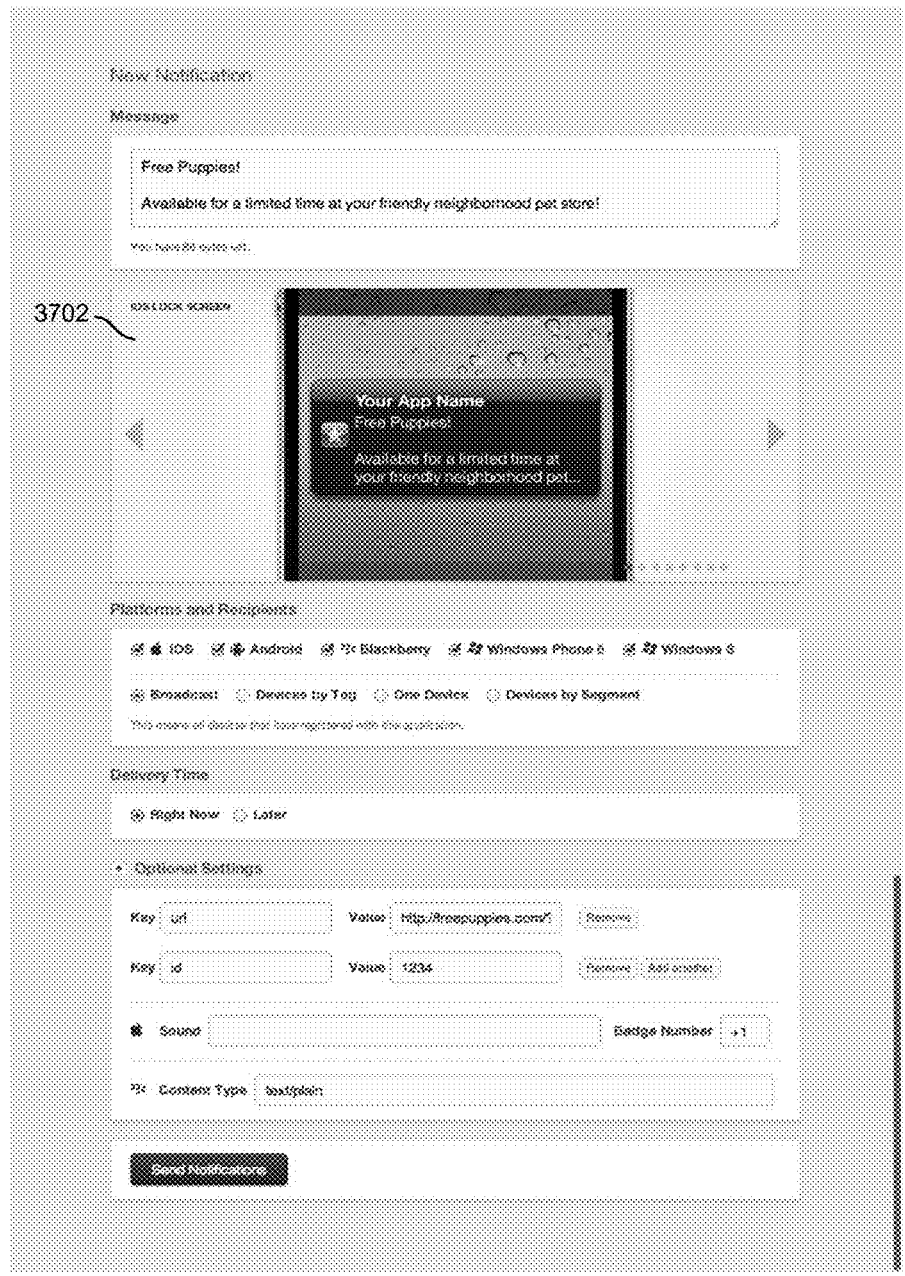
FIG. 37 is a diagram illustrating an embodiment of an interface for composing and previewing a push notification.

FIG. 37 is a diagram illustrating an embodiment of an interface for composing and previewing a push notification. In this example, an alternate preview is rendered for the same example notification being composed in FIG. 36. In this example, a preview of the notification on an iOS lock screen is shown. At 3702, a preview of the push notification as it would appear on an instance of an iOS device is shown. In this example, the message has been converted based on the line-break, truncation, and positioning rules associated with the iOS lock screen preview landing screen. As shown, the carriage return and explicit line-break for the message separating the sentences "Free Puppies!" and "Available for a limited time at your friendly neighborhood pet store!" have been maintained. However, the second line of the message in the message field exceeds the character width of the push notification display area, and is therefore broken into two lines. Additionally, as the total message exceeds the four lines allotted for text in the push notification, the preview shows the message truncated after the word "pet," with ellipses added. An icon for the application is also shown positioned next to the message in the rendered push notification.

Figure 38:
FIG. 38 is a diagram illustrating an embodiment of an interface for composing and previewing a push notification.

FIG. 38 is a diagram illustrating an embodiment of an interface for composing and previewing a push notification. In this example, a preview of an iOS device displaying rich media (which is included in a rich push message) is shown.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor, and
a memory comprising instructions that when executed, causes the processor to:
receive a first selection of a display option comprising at least one of: an operating system of a first device, a device type, a device size, an application type, and a landing page, wherein the landing page is one of a locked screen, an unlocked screen, or a notification center screen;
select, based on device rules for displaying a push notification according to the selected display option for the first device, a set of display configurations that are compatible with display of push notifications on the first device, wherein the push notifications comprise at least one of text messages, icons, or sounds;
provide an interface configured to receive, from a user device, instructions associated with a user-specified push notification, the interface including the set of display configurations;
receive the instructions from the user device, the received instructions including a selection of one or more configurations from the set of display configurations; and
render, to the user device, the push notification on a display interface corresponding to the first device, in accordance with the selected one or more configurations from the set of display configurations in the received instructions.

2. The system of claim 1, wherein the selection is received as a choice made from a plurality of devices.

3. The system of claim 1, wherein the processor is further configured to receive a second selection associated with a second device, wherein the first and second devices are different.

4. The system of claim 3, wherein the processor is further configured to replace the graphical rendering of the display interface of the instance of the first device with a graphical rendering of how a display interface of an instance of the second device would display the push notification.

5. The system of claim 1, wherein the received instructions include alert text.

6. The system of claim 1, wherein the received instructions include at least one key-value pair, the key-value pair comprising a key corresponding to an identifier that identifies a notification type specific to the first device, and a value corresponding to notification content to be associated with an instance of the specific notification type.

7. The system of claim 1, wherein the received instructions include at least one recipient specification.

8. The system of claim 7, wherein the recipient specification includes at least one of a specific user, a group of users, an indication of all users, a tag, and a delivery time.

9. The system of claim 1, wherein the interface includes a control which when interacted with on the user device, causes instances of different devices to be graphically rendered.

10. The system of claim 1, wherein the interface includes a control which when interacted with by the user, causes the processor to graphically render how the display interface of the first device would display the push notification, in a different landing page than the landing page selected in the first selection of the display option.

11. The system of claim 1, wherein the processor is further configured to receive a send request and in response to receiving the send request, the processor is configured to send the push notification.

12. The system of claim 1, wherein the processor is further configured to receive, from the user device, a modification to the instructions, and in response to receiving the modification, graphically render to the user how the display interface would change in accordance with the modifications.

13. The system of claim 1, wherein the processor is further configured to determine text formatting information for the user-specified push notification based on rules associated with the selected display configurations, rules of the selected operating system, and the device rules of the first device, the text formatting information including line breaking information.

14. The system of claim 13, wherein determining text formatting information further comprises determining a character limit for content of the user-specified push notification and determining a truncation point for content of the user-specified push notification based on the determined character limit.

15. The system of claim 1, wherein the system includes a byte count engine configured to determine a size of a push notification based at least in part on an identification of the first device and the received instructions.

16. The system of claim 1, wherein the system includes a payload validation engine configured to perform a validation on the user-specified push notification based at least in part on validation rules defined for the selected display configurations, rules of the selected operating system, and the device rules of the first device.

17. The system of claim 16, wherein the validation includes checking for at least one of: the notification exceeding a maximum length, no alert text set, an invalid recipient list, and a scheduled delivery time in the past.

18. The system of claim 5, wherein the processor is further configured to graphically render the display interface at least in part by determining at least one of a size and a location of an area for the alert text.

19. The system of claim 18, wherein the processor is further configured to graphically render the display interface at least in part by determining a placement of an icon within the area.

20. A method, comprising:
receiving a first selection of a display option comprising at least one of: an operating system of a first device, a device type, a device size, an application type, and a landing page, wherein the landing page is one of a locked screen, an unlocked screen, or a notification center screen;
selecting, based on device rules for displaying a push notification according to the selected display option for the first device, a set of display configurations that are compatible with display of push notifications on the first device, wherein the push notifications comprise at least one of text messages, icons, or sounds;
providing an interface configured to receive, from a user device, instructions associated with a user-specified push notification, the interface including the set of display configurations;
receiving the instructions from the user device, the received instructions including a selection of one or more configurations from the set of display configurations; and
rendering, to the user device, the push notification on a display interface corresponding to the first device, in accordance with the selected one or more configurations from the set of display configurations in the received instructions.

21. A computer program product embodied in a non-transitory computer readable storage medium and comprising computer instructions for:
receiving a first selection of a display option comprising at least one of: an operating system of a first device, a device type, a device size, an application type, and a landing page, wherein the landing page is one of a locked screen, an unlocked screen, or a notification center screen;
selecting, based on device rules for displaying a push notification according to the selected display option for the first device, a set of display configurations that are compatible with display of push notifications on the first device, wherein the push notifications comprise at least one of text messages, icons, or sounds;
providing an interface configured to receive, from a user device, instructions associated with a user-specified push notification, the interface including the set of display configurations;
receiving the instructions from the user device, the received instructions including a selection of one or more configurations from the set of display configurations; and
rendering, to the user device, the push notification on a display interface corresponding to the first device, in accordance with the selected one or more configurations from the set of display configurations in the received instructions.

22. The system of claim 1, wherein the set of display configurations that are compatible with display of push notifications on the first device comprise a subset of at least one of: device states, landing pages, applications, and content items for which push notifications can be displayed on the first device as defined by the device rules of the first device.

23. The system of claim 1, wherein the set of display configurations that are compatible with display of push notifications on the first device comprise combinations of two or more of: device states, landing pages, applications, and content items for which push notifications can be displayed on the first device as defined by the device rules of the first device.

24. The system of claim 1, wherein the device rules for displaying a push notification comprise at least one of push notification layout rules, text formatting rules, and payload validation rules.

* * * * *